United States Patent [19]
Maggioncalda et al.

[11] Patent Number: 5,918,217
[45] Date of Patent: Jun. 29, 1999

[54] USER INTERFACE FOR A FINANCIAL ADVISORY SYSTEM

[75] Inventors: Jeff N. Maggioncalda, Menlo Park; Christopher L. Jones, Foster City; William F. Sharpe, Los Altos; Ken Fine, Menlo Park; Ellen Tauber, Palo Alto, all of Calif.

[73] Assignee: Financial Engines, Inc., Palo Alto, Calif.

[21] Appl. No.: 08/988,226

[22] Filed: Dec. 10, 1997

[51] Int. Cl.⁶ ...................................................... G06F 17/00
[52] U.S. Cl. .................................... 705/36; 705/4; 705/38
[58] Field of Search ................................... 705/4, 35, 36, 705/38

[56] References Cited

U.S. PATENT DOCUMENTS

| | | |
|---|---|---|
| 3,634,669 | 1/1972 | Soumas et al. . |
| 3,697,693 | 10/1972 | Deschenes et al. . |
| 4,007,355 | 2/1977 | Moreno . |
| 4,334,270 | 6/1982 | Towers . |
| 4,346,442 | 8/1982 | Musmanno . |
| 4,376,978 | 3/1983 | Musmanno . |
| 4,597,046 | 6/1986 | Musmanno et al. . |
| 4,642,767 | 2/1987 | Lerner . |
| 4,722,055 | 1/1988 | Roberts . |

(List continued on next page.)

OTHER PUBLICATIONS

Sharpe, "Asset Allocation: Management Style and Performance Measurement", The Journal of Portfolio Management, Winter 1992, vol. 18, No. 2, pp. 1–14.

Sharpe, et al., "Investments", Fifth Edition, Chapter 8, pp. 193–231, Chapter 11, pp. 293–321, Chapter 23, pp. 827–863, 1995.

Woodwell, "Automating Your Financial Portfolio", Second Edition, Dow Jones–Irwin, 1983 & 1986.

The Funds Management Group, Inc., "Funds Allocation System", Software Update, 8 pages. No date.

IFPS/Optimum "The Extended Analysis Language for All Users", 1986, 2 pages.

Henry Fersko–Weiss, "Dialing for Profits, Managing the Market", Product Reviews, Personal Computing, May 1986.

"A Financial Planner With Nerves of Silicon", Business Week, Oct. 7, 1985, p. 108.

(List continued on next page.)

*Primary Examiner*—Thomas R. Peeso
*Attorney, Agent, or Firm*—Blakely, Sokoloff, Taylor & Zafman LLP

[57] ABSTRACT

A user interface for a financial advisory system is provided. According to one aspect of the present invention, a user may interactively explore how changes in one or more input decisions such as a risk tolerance, a savings level, and a retirement age affect one or more output values such as a probability of achieving a financial goal or an indication of short-term risk. A first and second visual indication are concurrently displayed. The first visual indication includes input mechanisms, such as slider bars, for receiving the input decisions. The second visual indication includes a set of output values that are based upon the input decisions and a recommended set of financial products. After updated values for the input decisions are received via the input mechanisms, a new recommended set of financial products and a new set of output values may be determined based upon the updated values. The second visual indication may then be updated to reflect the new set of output values. According to another aspect of the present invention, a graphical input mechanism for receiving a desired level of investment risk may be calibrated. A set of available financial products, such as a set of mutual funds, and a predefined volatility, such as the volatility of the Market Portfolio are received. The settings associated with the graphical input mechanism are constrained based upon the set of available financial products. Additionally, the calibration of the units of the graphical input mechanism may be expressed as a relationship between the volatility associated with a setting of the graphical input mechanism and the predefined volatility.

44 Claims, 14 Drawing Sheets

U.S. PATENT DOCUMENTS

| | | |
|---|---|---|
| 4,742,457 | 5/1988 | Leon et al. . |
| 4,752,877 | 6/1988 | Roberts et al. . |
| 4,774,663 | 9/1988 | Musmanno et al. . |
| 4,868,376 | 9/1989 | Lessin et al. . |
| 4,876,648 | 10/1989 | Lloyd . |
| 4,885,685 | 12/1989 | Wolfberg et al. . |
| 4,910,676 | 3/1990 | Alldredge . |
| 4,933,842 | 6/1990 | Durbin et al. . |
| 4,953,085 | 8/1990 | Atkins . |
| 4,989,141 | 1/1991 | Lyons et al. . |
| 5,025,138 | 6/1991 | Cuervo . |
| 5,220,500 | 6/1993 | Baird et al. . |
| 5,454,104 | 9/1995 | Steidlmayer et al. . |
| 5,523,942 | 6/1996 | Tyler et al. ................... 705/4 |
| 5,590,037 | 12/1996 | Ryan et al. . |
| 5,592,379 | 1/1997 | Finfrock et al. ............ 705/4 |
| 5,644,727 | 7/1997 | Atkins . |

OTHER PUBLICATIONS

Fayette Hickox, Information Technology, "Learning about Artificial Intelligence", Institutional Investor, Jul. 1986, pp. 209–210.

Daniel P. Wiener, "Software Packages for Investors", Fortune/1987 Investors Guide, pp. 185–188.

Paul Lichtman, "Software: The Professional Plan", Lotus, Nov. 1986, pp. 121 & 140.

"Barra Provides Combined Style Analysis And Asset Allocation Capabilities", downloaded from Website http://www.barra.com, in Jul. of 1998.

"EnCorr Products and Services", downloaded from Website http://www.ibbotson.com, in Jul. of 1998.

"Net Results™, Your On–Line Financial Advisor", downloaded from Website http://www.isnetwork.com, in Dec. of 1997.

USER INTERFACE FOR A FINANCIAL ADVISORY SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the field of financial advisory services. More particularly, the invention relates to a system for advising a user regarding feasible and recommended products from a set of financial products and a user interface for such a system.

BACKGROUND OF THE INVENTION

The number of financial products available to individual investors has grown dramatically in recent years, resulting in many individuals being overwhelmed by the information and choices offered to them. The term "financial products" as used herein encompasses a legal representation of the right (often denoted as a claim or security) to provide or receive prospective future benefits under certain stated conditions. At any rate, individuals purchase financial products to meet their needs, and needs among individuals vary greatly.

A number of computer financial analysis systems have been developed in recent years to help individuals select the best financial products to meet their needs. These systems typically perform analysis based upon mathematical models regarding mortgage refinancing, loan amortization, retirement planning, and investment alternatives, for example.

However, typical prior art financial software packages are limited in several ways. One limitation of prior systems is the binary nature of their output. For example, given a set of personal financial data representing an initial financial state such as salary, assets, and investments, the typical simplistic calculators employed by prior art systems will indicate to a user that they will either achieve a financial goal or not, ignoring the reality that the true chance of achieving a goal is usually neither 0% nor 100% but somewhere in between. Consequently, the so called "advice" rendered by many prior art investment software packages can be misleading.

Further, some prior art financial analysis programs which focus on investments require the user to provide estimates of future inflation, interest rates and the expected return on their investments. As should be appreciated, one of the problems with this approach is the user is allowed to create scenarios that are not feasible. In this type of prior art system, the user is likely, and is in fact encouraged, to simply increase the expected investment returns until a desired portfolio value is achieved. As a result, the user creates an unrealistic future economic scenario based on unattainable portfolio returns.

In addition, the user interactions with financial analysis programs in the prior art have various other disadvantages which are overcome by the present invention. Notably, prior art systems typically do not provide realistic estimates of the retirement horizon risk-return tradeoff given a user's specific investments and financial circumstances. This makes informed judgments about the appropriate level of investment risk very difficult. The notion of a risk-return trade off is fundamental to modern portfolio theory, and any system which fails to convey long-term risk and return fails to provide information essential to making informed investment decisions.

In view of the foregoing, what is needed is a financial advisory system that focuses individuals on the financial decisions they must make today, recommends one or more specific financial products given these decisions, and, perhaps most importantly, illustrates the chance that their financial decisions combined with the recommended financial products will meet their needs in the future.

It is also desirable to incorporate an intelligent user interface that communicates the fundamental risk-return tradeoffs to help individuals evaluate investment options. For example, it is desirable to provide a system that provides a visual indication representative of the probability of achieving a financial goal rather than a binary result. Also, it is advantageous to calibrate graphical input mechanisms so that the range of inputs allowable by these mechanisms are in fact feasible based upon available products. Additionally, to provide the user with the opportunity to make informed choices among an available set of financial products, it is desirable to present realistic estimates of risk based on projected outcomes associated with the specific recommended financial products. Importantly, because there is no one way that people look at risk, it is also desirable to present various notions of risk such as short-term risk, long-term risk, and the risk of not reaching a particular financial goal.

SUMMARY OF THE INVENTION

A user interface for a financial advisory system is described. According to one aspect of the present invention, a user may interactively explore how changes in one or more input decisions affect one or more output values. A first and second visual indication are concurrently displayed. The first visual indication includes input mechanisms for receiving input decisions and the second visual indication includes a set of output values that are based upon the input decisions and a recommended set of financial products. In one embodiment, these output values include the projected future value of the recommended financial products and the chance that the user meets his/her goals. After updated values for the input decisions are received via the input mechanisms, a new recommended set of financial products and a new set of output values may be determined based upon the updated values. At which point, the second visual indication may be updated to reflect the new set of output values. In this manner, the user is focused on the relevant decisions that can be made to reach one or more future financial goals and the effects of modifying one or more of the decisions.

According to a second aspect of the present invention, a graphical input mechanism for receiving a desired level of investment risk may be calibrated. A set of available financial products and a predefined volatility are received. The settings associated with the graphical input mechanism are constrained based upon the set of available financial products. As a result, the user is prevented from selecting a level of risk that is outside of the feasible set of risk that is actually available. Additionally, the calibration of the units of the graphical input mechanism may be expressed as a relationship between the volatility associated with a setting of the graphical input mechanism and the predefined volatility.

According to a third aspect of the present invention, an indication is provided to the user of the probability of achieving a financial goal. A financial goal is received from the user. In addition, inputs upon which i probability distribution is dependent are received. The probability distribution may represent a set of possible future portfolio values, for example, based upon the inputs. The probability of achieving the financial goal is determined by evaluating the cumulative probability distribution that meets or exceeds the financial goal. Finally, a visual indication may be provided to the user of the probability of achieving the financial goal.

According to a forth aspect of the present invention, various aspects of financial risk are presented to the user in order to help the user deal with and control financial risk. A financial goal is received from the user. In addition, inputs including decision variables upon which a probability distribution is dependent are received. The probability distribution may represent probabilities over time of the user having a certain amounts of wealth, for example. A first and second visual representation are displayed. The first visual representation illustrates a risk of not achieving the financial goal based upon the probability distribution and the second visual representation illustrates a short-term risk of how much the portfolio value might decline in the near future. Additionally, a third visual representation may also be displayed to illustrate the long-term financial risk associated with the decision variables. Advantageously, risk is expressed in terms of outcomes that may result from specific decisions and financial products thereby enabling the user to select the amount of risk consistent with his/her risk preference.

According to a fifth aspect of the present invention, a recommended allocation of wealth among an available set of financial products is presented to the user. Decision inputs and a set of available financial products are received. Each of the financial products has an associated volatility. The set of available financial products are ordered by their respective volatilities. A recommended allocation of wealth is determined for each financial product based upon the decision inputs and a graphical indication is displayed of the recommended allocation of wealth. The graphical indication includes graphical segments associated with each financial product which have lengths corresponding to the recommended allocation of wealth to the particular financial product.

According to a sixth aspect of the present invention, a recommendation may be updated based upon a user specified constraint. A graphical indication of a current recommended allocation of wealth among an available set of financial products is provided to the user. The graphical indication includes graphical segments each having a size corresponding to the current recommended allocation for the associated financial product. A selected graphical segment may be resized to correspond in size to a user desired allocation responsive to activation of an input device. Subsequently, a new set of financial products are recommended while keeping the allocation of the financial product corresponding to the selected segment fixed at the user desired allocation. Then, the graphical indication is updated to represent the new recommended allocation. Advantageously, in this manner, the user may directly manipulate the recommended portfolio and observe the impact on the recommendation.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A user interface for a financial advisory system is described. According to embodiments of the present invention, a stochastic simulator may provide information relating to various aspects of financial risk including the risk of not achieving a particular financial goal and short- and long-term financial risks in order to help a user of the financial advisory system deal with and control such financial risks. Other aspects of the present invention allow the user to focus on his/her decisions regarding investment risk, savings, and retirement age while interactively observing the impact of those decisions on the range of possible investment outcomes.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor which is programmed with the instructions to perform the steps of the present invention. Alternatively, the steps of the present invention may be performed by specific hardware components that contain hardwired logic for performing the steps, or by any combination of programmed computer components and custom hardware components. While, embodiments of the present invention will be described with reference to a financial advisory system, the method and apparatus described herein are equally applicable to other types of asset allocation applications, financial planning applications, investment advisory services, and financial product selection services, automated financial product screening tools such as electronic personal shopping agents and the like.

SYSTEM OVERVIEW

Figure 1:
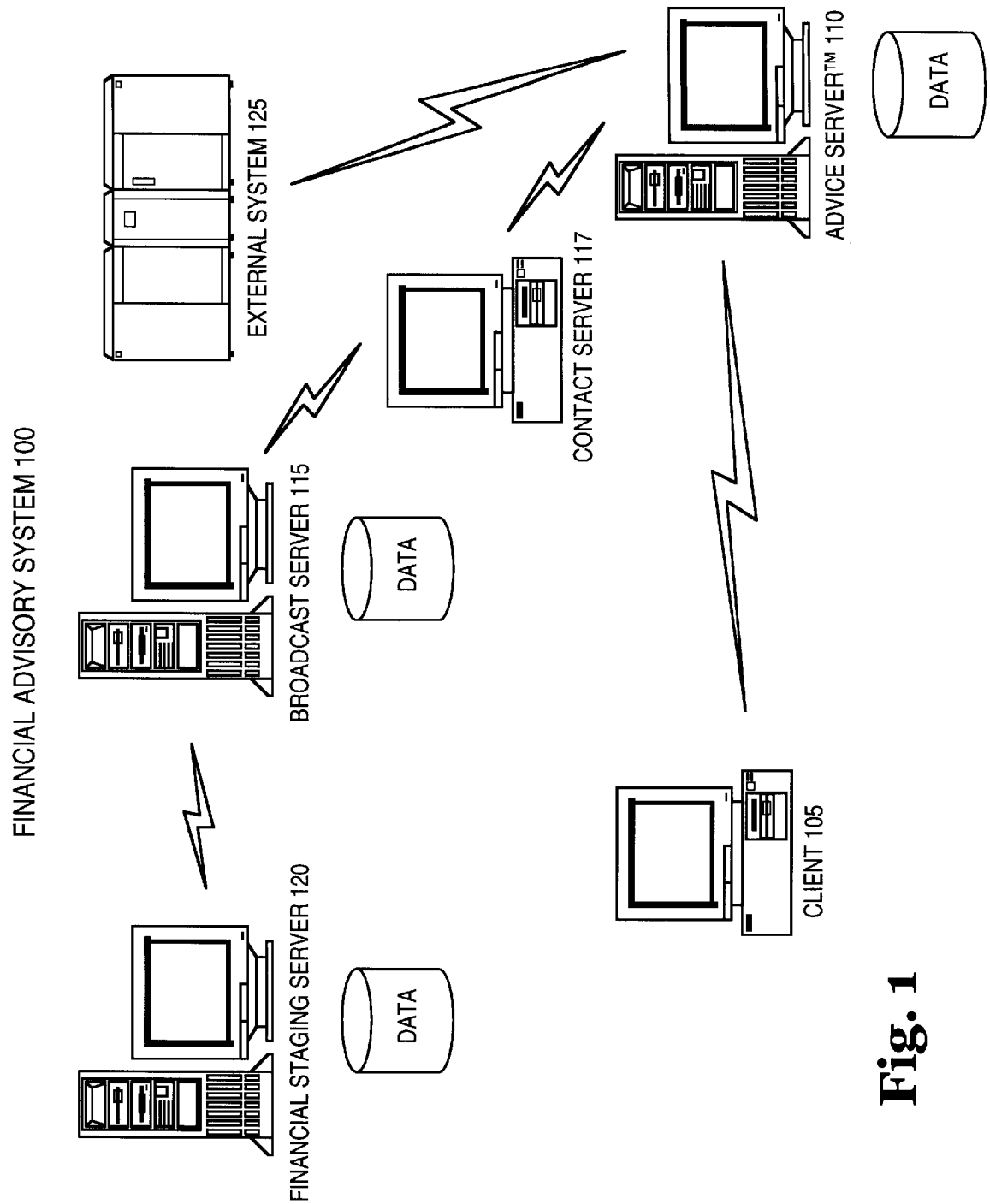
FIG. 1 illustrates a financial advisory system according to one embodiment of the present invention.

The present invention may be included within a client-server based financial advisory system 100 such as that illustrated in FIG. 1. According to the embodiment depicted in FIG. 1, the financial advisory system 100 includes a financial staging server 120, a broadcast server 115, a content server 117, an AdviceServer™ 110 (AdviceServer™ is a trademark of Financial Engines, Inc., the assignee of the present invention), and a client 105.

The financial staging server 120 may serve as a primary staging and validation area for the publication of financial content. In this manner, the financial staging server 120 acts as a data warehouse. Raw source data, typically time series data, may be refined and processed into analytically useful data on the financial staging server 120. On a monthly basis, or whatever the batch processing interval may be, the financial staging server 120 converts raw time series data obtained from data vendors from the specific vendor's format into a standard format that can be used throughout the financial advisory system 100. Various financial engines may also be run to generate data for validation and quality assurance of the data received from the vendors. Any calibrations of the analytic data needed by the financial engines may be performed prior to publishing the final analytic data to the broadcast server 115.

The broadcast server 115 is a database server. As such, it runs an instance of a Relational Database Management System (RDBMS), such as Microsoft SQL-Server™, Oracle™ or the like. The broadcast server 115 provides a single point of access to all fund information and analytic data. When advice servers such as AdviceServer 110 need data, they may query information from the broadcast server database. The broadcast server 115 may also populate content servers, such as content server 117, so remote implementations of the AdviceServer 110 need not communicate directly with the broadcast server 115.

The AdviceServer 110 is the primary provider of services for the client 105. The AdviceServer 110 also acts as a proxy between external systems, such as external system 125, and the broadcast server 115 or the content server 117. The AdviceServer 110 is the central database repository for holding user profile and portfolio data. In this manner, ongoing portfolio analysis may be performed and alerts may be triggered, as described further below.

According to the embodiment depicted, the user may interact with and receive feedback from the financial advisory system 100 using client software which may be running within a browser application or as a standalone desktop application on the user's personal computer 105. The client software communicates with the AdviceServer 110 which acts as a HTTP server.

AN EXEMPLARY COMPUTER SYSTEM

Figure 2:
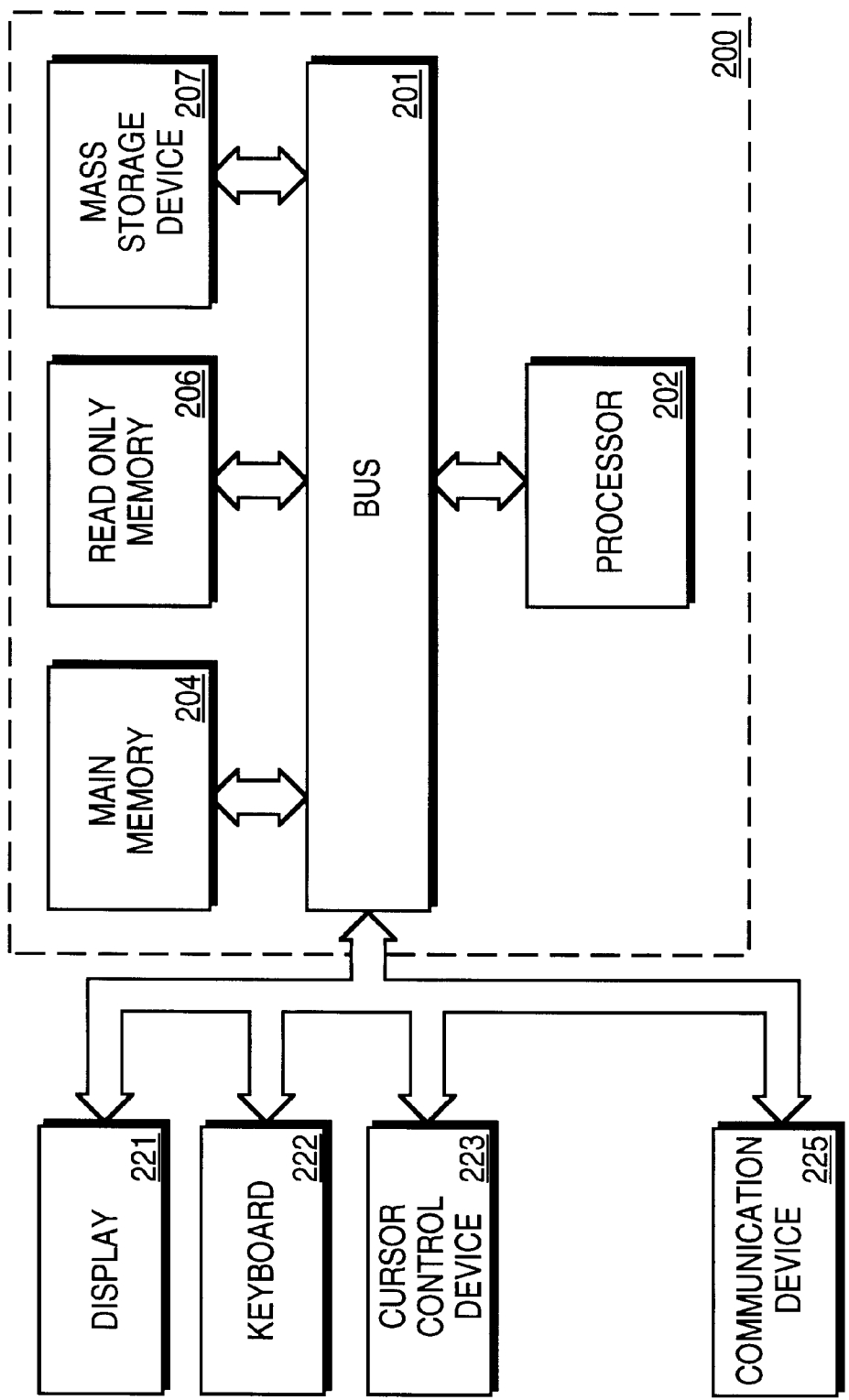
FIG. 2 is an example of a computer system upon which one embodiment of the present invention may be implemented.

Having briefly described one embodiment of the financial advisory system 100, a computer system 200 representing an exemplary client 105 or server in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. For example, graphical depictions of expected portfolio performance, asset allocation for an optimal portfolio, charts indicating short- and long-term financial risk, icons indicative of the probability of achieving various financial goals, and other data types may be presented to the user on the display device 221. Typically, an alphanumeric input device 222, including alphanumeric and other keys, is coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for accessing remote servers, such as the AdviceServer™ 110, or other servers via the Internet, for example. The communication device 225 may include a modem, a network interface card, or other well known interface devices, such as those used for coupling to an Ethernet, token ring, or other types of networks. In any event, in this manner, the computer system 200 may be coupled to a number of servers via a conventional network infrastructure, such as a company's Intranet and/or the Internet, for example.

EXEMPLARY FINANCIAL ANALYSIS SYSTEM

Figure 3:
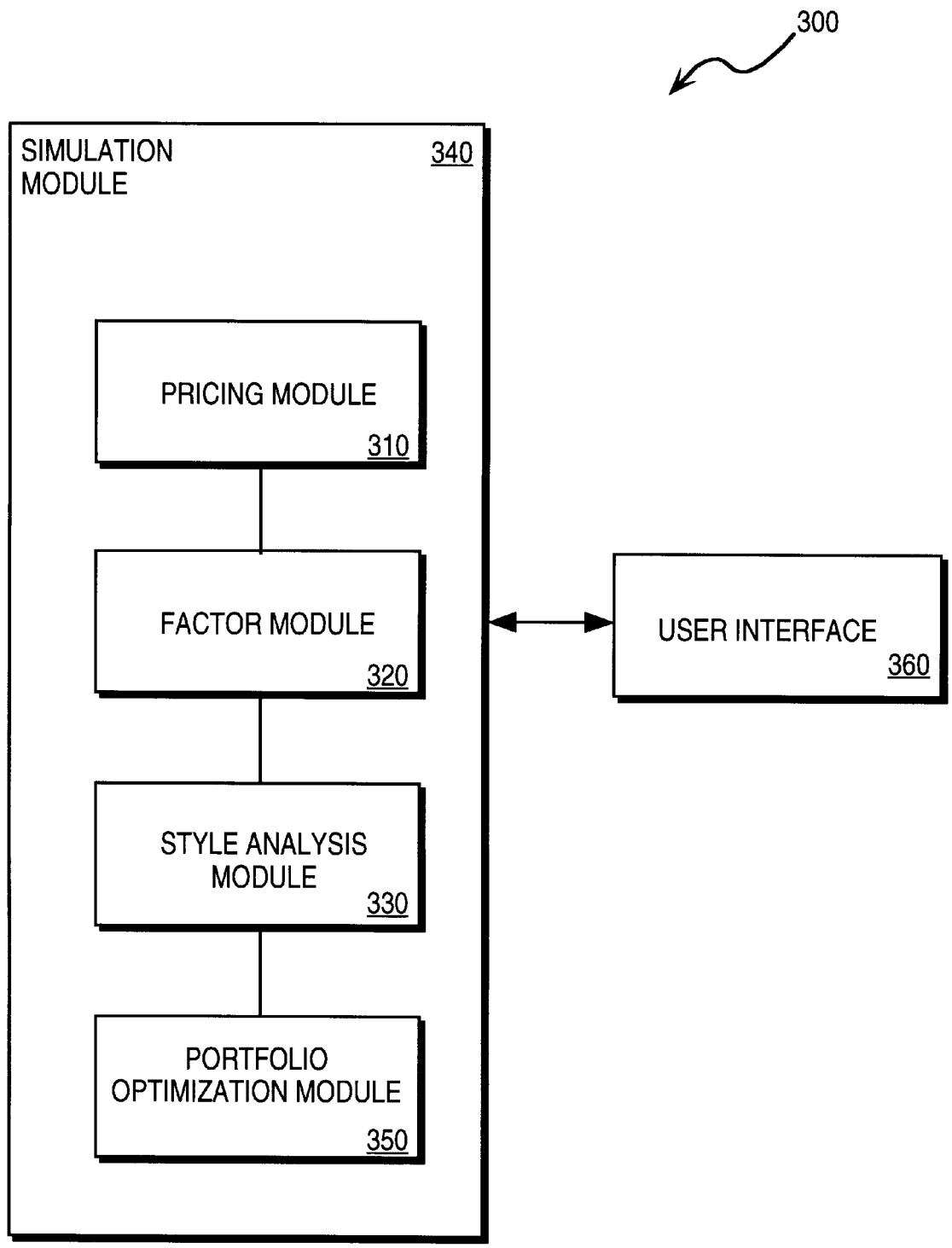
FIG. 3 is a simplified block diagram illustrating one embodiment of a financial analysis system that may employ the user interface of the present invention.

FIG. 3 is a simplified block diagram illustrating a financial analysis system 300 in which one embodiment of the present invention may be used. Generally, the financial advisory system 300 includes a simulation module 340 which receives input data from a user interface (UI) 360 and provides data, such as probability distributions, to the UI 360. The simulation module may include a simulation engine for empirically generating draws from a random distribution. According to the embodiment depicted, the simulation module 340 further includes a pricing module 310, a factor module 320, a style analysis module 330, and a portfolio optimization module 350.

The pricing module 310 may generate pricing data for one or more assets. In one embodiment, pricing module 310 generates pricing data for three assets (e.g., short-term bonds, long-term bonds and U.S. equities). These assets are used as core assets by simulation module 340 for simulation functions. Alternatively, the core assets may be different types of assets, such as U.S. equities and bonds (making no distinction between short-term and long-term bonds). Of course, a different number of core assets may also be used.

In one embodiment, pricing module 310 generates a number of asset scenarios. Each scenario is an equally likely outcome based on the inputs to financial advisory system 300. By generating a number of scenarios with pricing module 310, financial advisory system 300 may generate statistics for different projected asset valuations. For example, financial advisory system 300 may provide probability distributions for each projected asset valuation.

Factor module 320 receives core asset pricing data from pricing module 310 and maps the data onto a set of factors. Factors output by factor module 320 are used by returns-based style analysis module 330 to generate style exposures for particular assets. Factor modules and style analysis are well known in the art and are not described in greater detail herein. Factor module 320 and style analysis module 330 may perform the functions as described in "Asset allocation: Management style and performance measurement," by William F. Sharpe, Journal of Portfolio Management, Vol. 18, No. 2, which is hereby incorporated by reference.

The portfolio optimization module 350 may determine one or more optimal portfolios based on input provided to financial advisory system 300 via UI 360. Portfolio optimization may be performed in any manner known in the art and is not central to the present invention. Importantly, the simulation module 340 may reside on a server or on the same computer upon which the UI 360 resides. As will be described in further detail below, the UI 360 may include various mechanisms for data input and output to provide the user with a means of interacting with and receiving feedback from the financial advisory system 300, respectively.

Further description of a financial advisory system that may incorporate various features of the present invention is disclosed in a copending U.S. Patent application entitled "FINANCIAL ADVISORY SYSTEM," application Ser. No. 08/982,942, filed on Dec. 2, 1997 and further description of a pricing kernel is disclosed in a copending U.S. Patent application entitled "PRICING KERNEL FOR FINANCIAL ADVISORY SYSTEM," application Ser. No. 08/982, 941, filed on Dec. 2, 1997 both of which are assigned to the assignee of the present invention and both of which are hereby incorporated by reference.

EXEMPLARY ADVICE SUMMARY SCREEN

The UI 360 attempts to help the user pick the right financial products to meet his/her needs in a world where the number of financial products and decisions related thereto may be overwhelming. According to one embodiment, the UI 360 helps the user pick the right products by focusing the user on the relevant decisions and showing the user various notions of risk via simulated outcomes that are based upon a set of recommended financial products that satisfy the user's current decision values.

Figure 4:
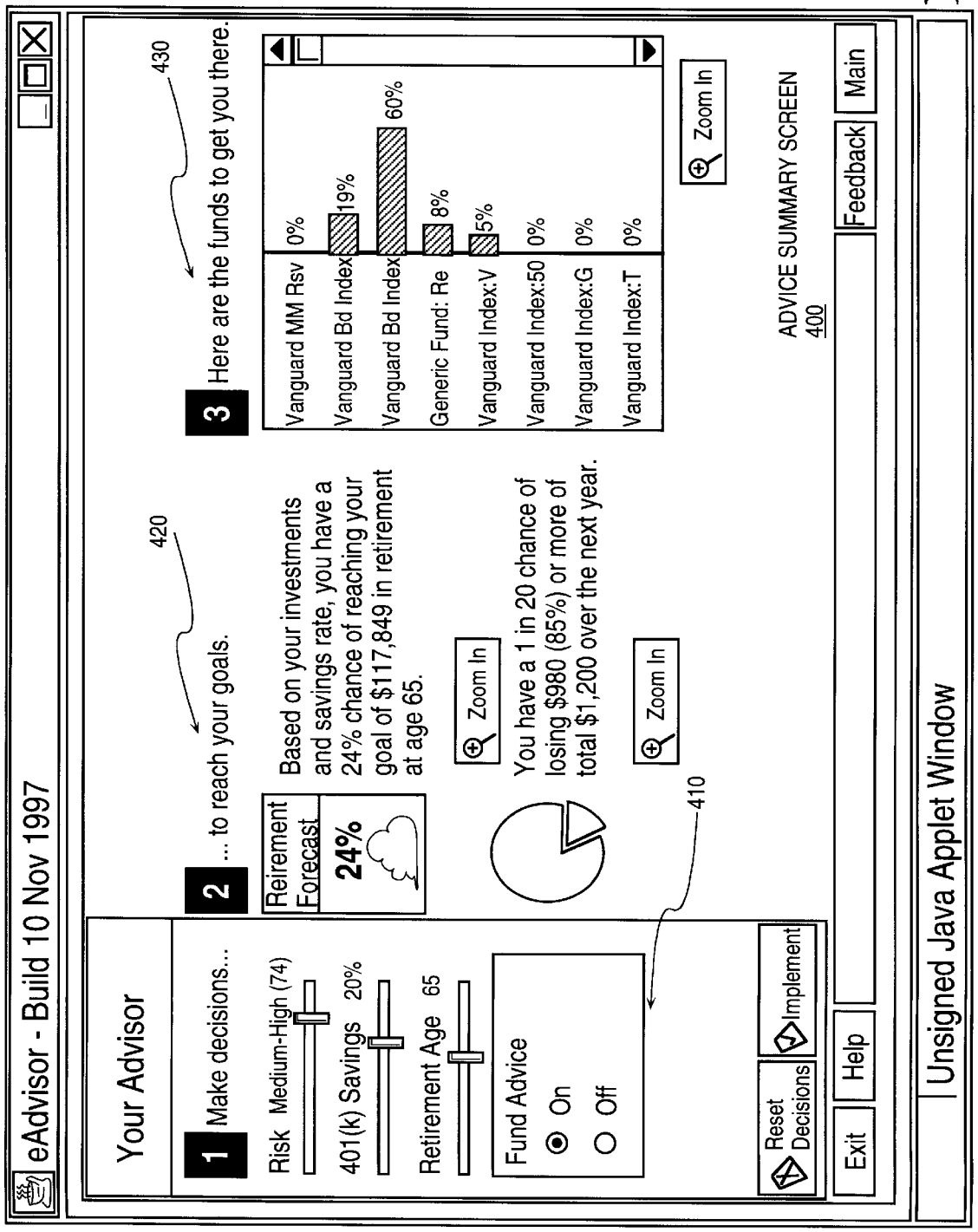
FIG. 4 illustrates an advice summary screen according to one embodiment of the present invention.

FIG. 4 illustrates an advice summary screen 400 according to one embodiment of the present invention. According to the embodiment depicted, the advice summary screen 400 includes three separate areas: (1) an area 410 for decisions, (2) an area 420 for depicting output values (also referred to as results), and (3) an area 430 for depicting recommended financial products.

Area 410 organizes all the decisions in one place. While prior art systems, such as retirement calculators, often make the user provide assumptions, data and decisions all in one place, according to the embodiment depicted, the decisions are kept separate. For example, in one embodiment, graphical input mechanisms, such as slider bars are grouped together in a predefined portion of the display that is separate from the output values and the recommended financial products. In this manner, the user will not confuse the things the user can control and change (e.g., savings rate or level of savings) and those things the user cannot change (e.g., inflation, rate of return for a particular financial product). Further, area 410 may present a constrained set of decisions. That is, only the relevant decisions upon which the user needs to focus may be presented. Another feature of the present embodiment is the fact that the decisions are always feasible and in some cases are additionally constrained to be optimal. Calibration of input mechanisms is discussed below.

Importantly, decision variables may vary from implementation to implementation. For example, in a retirement planning system, decision variables might include one or more of: risk, level of savings, and retirement age. In contrast, a mortgage analysis package may include decision variables such as cost of house, length of mortgage, and amount of down payment. Exemplary input mechanisms for allowing the user to specify decision variable values are described further below.

Based upon the decisions, the portfolio optimization module 350 produces a recommended set of financial products and the simulation engine projects the outcomes of holding the specific financial products recommended. Area 420 organizes all the output values relating to the recommended set of decisions and financial products in one place. For example, in one embodiment, graphical representations of the output values are grouped together in a predefined portion of the display that is separate from the decisions and the recommended financial products. The output values are made available to users to allow them to arrive at a set of financial products that satisfy their objective functions. For example, some individuals have a need to have a certain amount of money in the future and others may have a need to avoid short-term losses. Generally what is meant by objective function is a criterion that an individual considers important in making a decision. In various embodiments of the present invention, the output values may include: the cumulative probability of reaching a predetermined goal, the most likely value of a given portfolio at some future point in time, the financial loss that might occur with a 5% probability within the next 12 months, and various other statistics based on the probability distribution employed by the simulation engine.

Different output values may be appropriate for different people. Therefore, by presenting a number of different output values in area 420, users are given the ability to focus on whatever output values that may appeal to them. In one embodiment, this section of the advice screen 400 may be adaptive. That is, a user may select to have displayed one or more output values that are relevant to satisfying his/her objective function. Importantly, output values may be displayed in various orders and not all output values need to be displayed concurrently.

It is appreciated that different output values may also be appropriate for different problems. For example, in a retirement planning system, it may be desirable to have output values that depict short- and long-term financial risk and the cumulative probability of reaching a financial goal. While a mortgage analysis package may include output values such as cash flow, the highest a mortgage payment might be within 5 years, the probability of hitting the cap of an adjustable rate mortgage, the probability of paying higher interest costs for a particular fixed cost mortgage than a particular adjustable rate mortgage, etc.

Area 430 presents the user with the actions to be taken to get the results depicted in area 420. For example, an indication of recommended financial products may be provided based upon the user's decisions. Additionally, recommended proportions of a user's wealth that should be allocated to each financial product may be textually and/or graphically communicated. Another function of area 430 is organizing all the actions resulting from the decisions in one place. For example, in one embodiment, graphical representations of the recommended financial products are grouped together in a predefined portion of the display that is separate from the decisions and the output values.

Areas 410, 420, and 430 may be tied together by the simulation engine and the portfolio optimization module 350. For example, the portfolio optimization module 350 may produce an optimal set of financial products for a given set of decisions. Further, the simulation engine may connect the decisions to the results by projecting the outcomes of owning the set of financial products recommended by the portfolio optimization module 350.

In the embodiment depicted, areas 410, 420, and 430 are concurrently displayed. In alternative embodiments, however, two of the areas may be displayed concurrently and the third area may be displayed on another screen or at a later time. For example, a visual indication depicting input mechanisms for receiving input decisions and a visual indication depicting a set of output values based upon the input decisions may be displayed simultaneously thereby allowing the user to observe updates to the output values in response to changes to one or more of the input decisions. Then, when the user is satisfied with the output values, he/she may view the recommended financial products upon which the output values are based.

EXEMPLARY DECISION-RELATED FUNCTIONALITY

A. Slider Calibration

The UI 360 may provide graphical input mechanisms for allowing a user to provide values for one or more decision variable inputs. As discussed earlier, one disadvantage of some prior financial analysis programs is that the user is often presented with future scenarios that are not feasible and is therefore free to choose collections of financial products which are not optimal. That is, the user interfaces do not constrain the user's input to specific available financial products and they do not eliminate combinations of financial products which are dominated. By a dominated decision what is meant is a decision in which the user can absolutely make him/herself better off in one respect without making him/herself worse off in any other respect. In embodiments of the present invention, various dominated decisions may be eliminated. For example, the system may assume that the recommended portfolio should lie on the efficient frontier.

As a feature of the present embodiment, various positions (settings) of a graphical input mechanism relating to investment risk may be constrained based upon a set of available financial products available to the user.

Figure 5A:
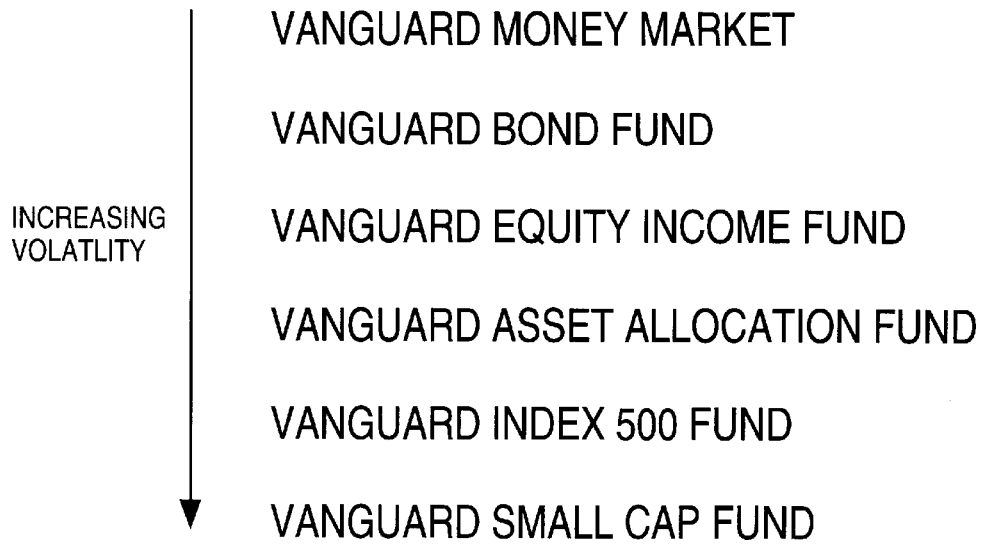
FIG. 5A illustrates an exemplary set of financial products that may be available to a user.

FIG. 5A illustrates an exemplary set of financial products that may be available to a user. The financial products, mutual funds in this example, may be the investments that are available through an employer's 401(k) program, for example. According to one embodiment, the financial products may be listed in order of the volatility of their returns. In this example, the Vanguard Bond Fund is more volatile than the Vanguard Money Market, the Equity Income Fund is more volatile than both the Money Market and the Bond Fund, and the Vanguard Small Cap Fund is the most volatile fund of the set.

Figure 5B:
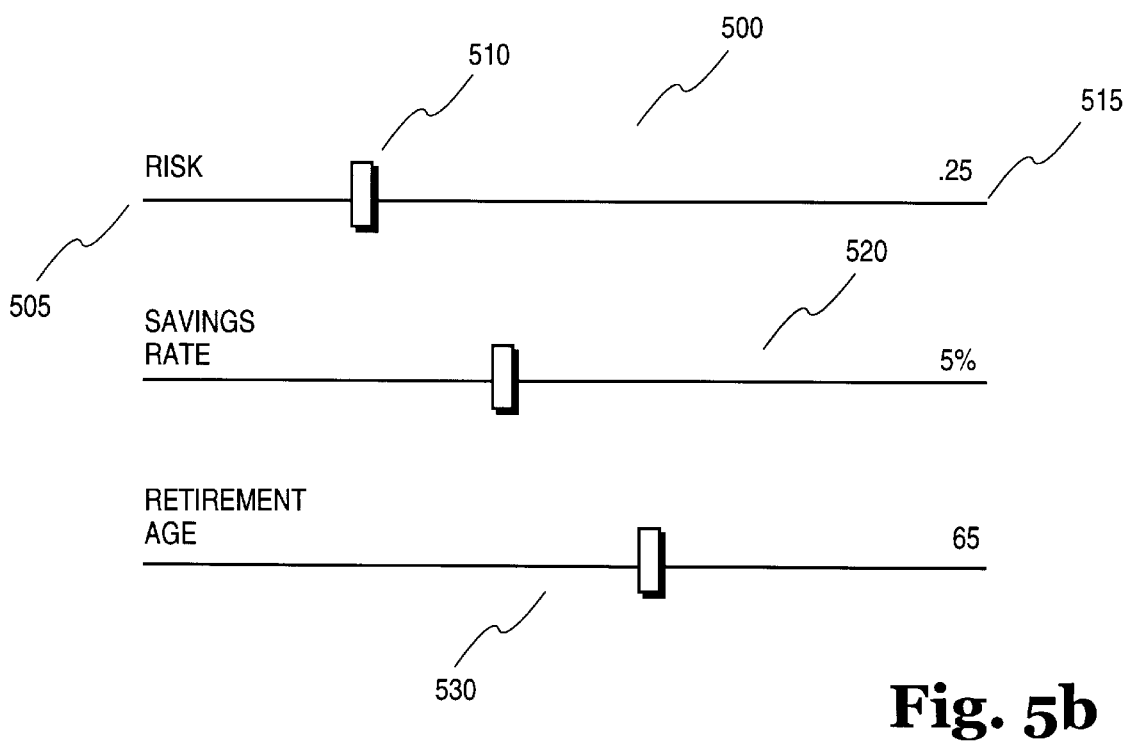
FIG. 5B illustrates slider bars that may be used for communicating values of decision variables according to one embodiment of the present invention.

Referring now to FIG. 5B, exemplary graphical input mechanisms are depicted. According to one embodiment of the present invention, slider bars are the mechanism by which values regarding decision variables are communicated between the simulator and the user. For example, the user may modify the current value of a particular decision variable by selecting the appropriate slider with an input device and moving the slider to a new position. According to the embodiment depicted, the decision variables upon which the simulator's probability distribution is dependent include the user's risk tolerance, the user's savings rate, and the user's desired retirement age. Therefore, in this example, the UI 360 includes at least three slider bars including a risk slider bar 500, a savings rate slider bar 520, and a retirement age slider bar 530.

The risk slider bar includes a left end point 505, a right end point 515, and a slider 510. The left end point 505 represents the lowest risk feasible portfolio and the right end point 515 represents the highest risk feasible portfolio. The user may indicate his/her risk preference to the financial analysis system by positioning the slider 510 anywhere between the left end point 505 and the right end point 515, inclusive. To assure every position of the risk slider 510 is within the feasible set of risk available to the user, the risk slider bar 500 is calibrated based upon the set of financial products that are available to the user. Preferably, the simulation module 340 additionally keeps the user on the efficient frontier by recommending only portfolios of financial products that will result in the highest return for a particular level of risk. This means as the user positions the risk slider 510, the simulation module 340 may construct a portfolio from the available set of financial products which has the highest returns for the specified level of risk. For example, assuming the risk slider bar 500 were calibrated to the set of mutual funds shown in FIG. 5A, then positioning the risk slider 510 at the left end point 505 would correspond to the highest return portfolio having a risk equivalent to or less than that of the Vanguard Money Market Fund. Similarly, positioning the slider 510 at the right end point 515 would correspond to the highest return portfolio having a risk equivalent to or less than that of the Vanguard Small Cap Fund. Advantageously, in this manner the UI 360 by way of the risk slider bar 500 prevents the user from selecting a level of risk outside of the feasible set of risk that is actually available to the user.

It should be appreciated the savings rate slider bar 520 and the retirement age slider bar 530 may be similarly constrained to feasible values. For example, the savings rate slider bar 520 may be constrained to values between zero and the maximum contribution for a particular account type, such as a 401(k). Also, the retirement age slider bar 530 may be constrained to allow values between the user's current age and an upper bound that may be determined with reference to actuarial data, for example.

B. Relating Settings of a Risk Input Mechanism to a Predefined Volatility

Figure 6:
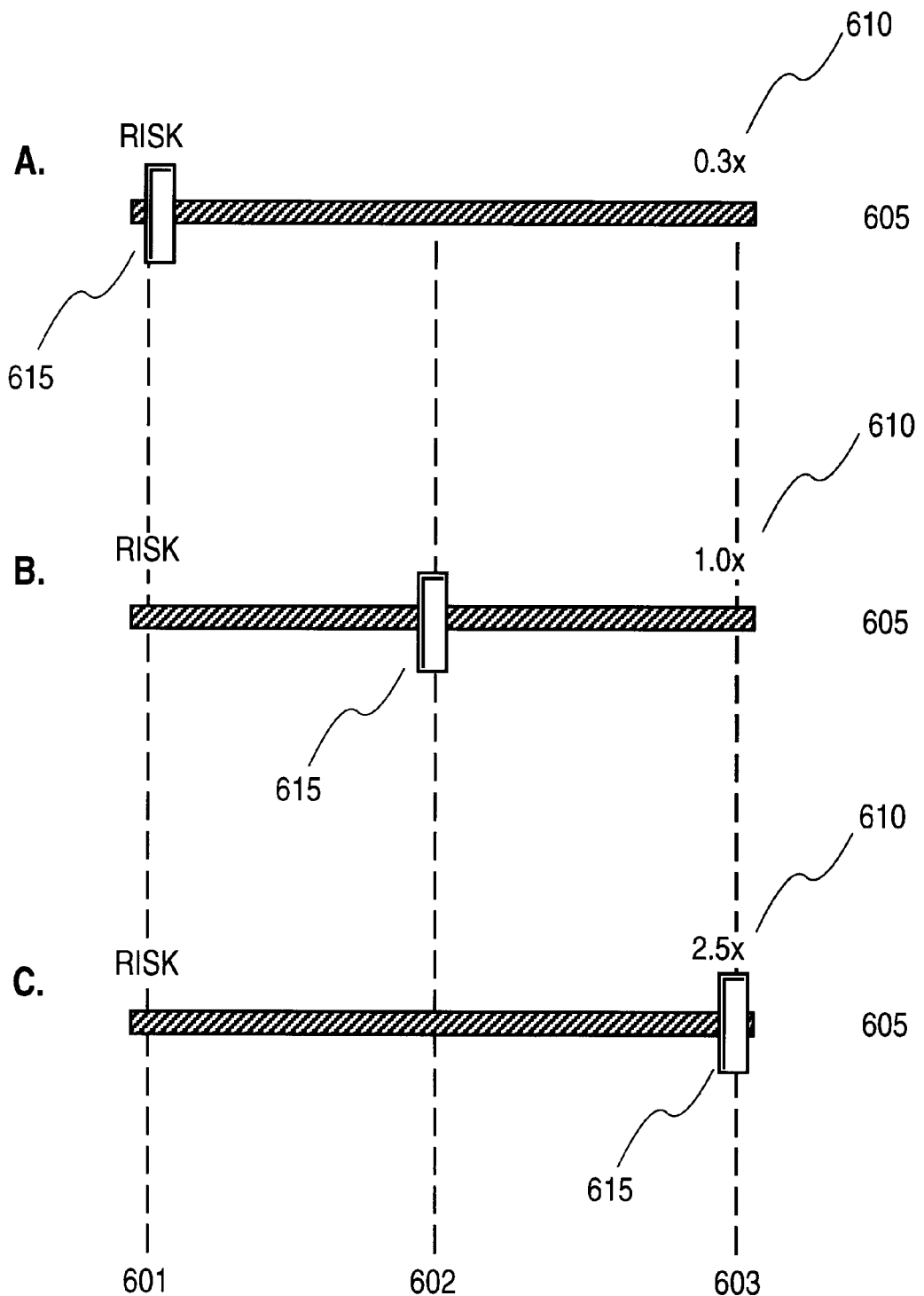
FIGS. 6A–C illustrate risk slider bar calibration according to one embodiment of the present invention.

FIGS. 6A–C are helpful for describing the calibration of a risk slider bar 605 according to one embodiment of the present invention. FIG. 6A depicts a risk slider bar 605 that may be provided to allow a user to specify a desired level of investment risk, for example. The risk slider bar 605 includes a slider 615, and an indication of the current volatility 610. According to one embodiment, the volatility of the risk slider bar 605 is expressed as a proportion of a predefined volatility, such as the volatility of the Market Portfolio or the volatility of the average individual investor's portfolio, for example. The Market Portfolio is the portfolio consisting of a value-weighted investment in all available assets.

Returning to the present example, as depicted in FIG. 6A, the risk slider bar 605 has its slider 615 positioned in a left most setting 601. The left most setting 601 corresponds to the volatility associated with the lowest volatility mix of financial products in the set of available financial products. In this example, the current volatility 610 of the risk slider 605 is 0.3×, indicating that the volatility associated with the current setting of the risk slider bar 615 is 30% of the volatility of the predefined volatility. As discussed below, the volatility of the financial products recommended by the portfolio optimization module 350 corresponds to the current setting of the risk slider 601.

Referring now to FIG. 6B, the risk slider bar 605 is shown with the slider 615 positioned at a midpoint setting 602. According to this embodiment, the midpoint setting 602 corresponds to the predefined volatility. Again, the units for risk slider bar 605 are expressed in terms of the volatility of setting 602 as a proportion of a predefined volatility, such as the volatility of the Market Portfolio. In this example, the current value 607 of the setting of the risk slider 602 is 1.0×, indicating that the volatility associated with the current setting of slider 602 is equal to the volatility of the predefined volatility.

Referring now to FIG. 6C, the right most setting 603 of the risk slider bar 605 reflects the volatility associated with the highest volatility mix of financial products in the set of available financial products. Again, the units for risk slider bar 605 are expressed in terms of the volatility of setting 603 is a proportion of a predefined volatility, such as the volatility of the Market Portfolio. In this example, the current value 608 of the setting of the risk slider 605 is 2.5×, indicating that the volatility associated with the current setting of slider 603 is 250% of the volatility of the predefined volatility.

Each setting of slider bar 605 (e.g., 601, 602, 603) corresponds to a unique volatility, and a recommended set of financial products whose volatility is equal to that volatility. Advantageously, in the manner described above, the user may choose the desired volatility of his/her portfolio of financial products relative to the predefined volatility. A portfolio having a volatility equal to the predefined volatility may be chosen by positioning the slider 615 at the midpoint 602. If the user would like the recommended portfolio to be less volatile than the predefined volatility, then the user may position the slider 615 to the left of the midpoint 602. Similarly, if the user would like the recommended portfolio to be more volatile than the predefined volatility, then the user may move the slider 615 to a position right of the midpoint 602. Further, it should be appreciated, the volatility associated with the midpoint 602 will remain the same regardless of the composition of the available set of financial products.

While only three different positions of the slider 615 have been described, it should be appreciated any number of positions may be located along the risk slider bar 605 and each position may be associated with a volatility measure defined by a constant times the portfolio volatility divided by the predefined volatility.

EXEMPLARY MECHANISMS FOR COMMUNICATING OUTPUT VALUES (RESULTS)

Figure 7A:
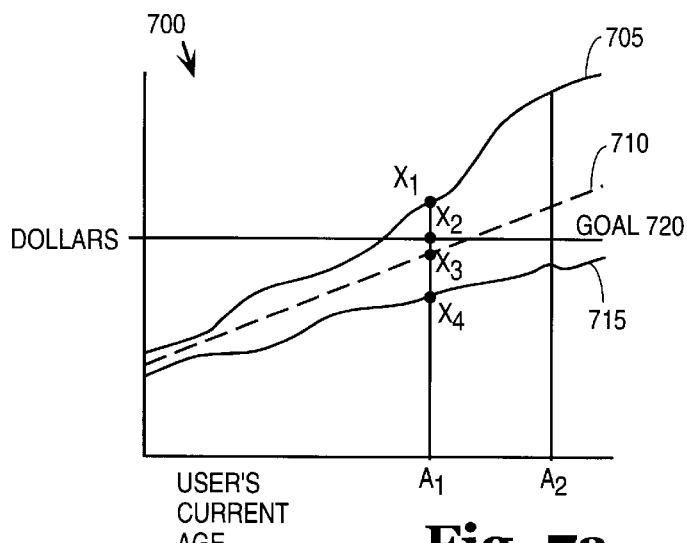
FIG. 7A illustrates a two dimensional chart which represents a range of possible values of a portfolio of financial products over time.

A. Exemplary Manner of Communicating Probabilities From a Probability Distribution The chart 700 of FIG. 7A represents a range of possible values of a portfolio of financial products over time. Starting with a set of financial products that have a current value today, a number of scenarios of how those financial products might grow taking into account contributions and withdrawals may be run by simulation module 340. The process that generates the probability distribution for each time period may be a simulation engine, a lookup table that was populated by a simulation engine, or an analytic approximation of the probability distribution that would be generated by the simulation engine. Those of ordinary skill in the art will appreciate that various other mechanisms may be employed to produce such a probability distribution.

The vertical axis of the chart 700 represents dollars and the horizontal axis represents time, in terms of the user's age, for example. The chart 700 further includes an upper line 705, a lower line 715, and a median line 710. For every point in time, there is a probability that the value, dollars in this example, will be as high as the goal 720.

Figure 7B:
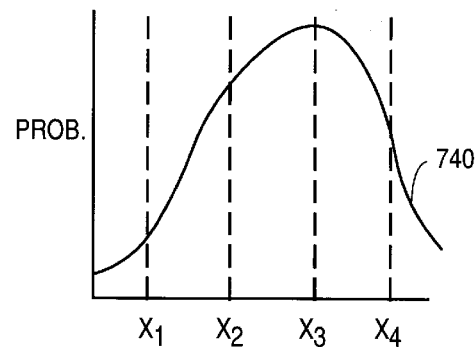
FIG. 7B is a cross section of the chart depicted in FIG. 7A which illustrates the probability distribution at a particular time.

In this example, the median line 710 represents a 50% chance of the corresponding dollar value being achieved at a particular point in time. The upper line 705 may represent an upside 5% tail. The lower line 715 may represent a downside 5% tail. Each slice in time represents a cross section of the probability distribution. FIG. 7B is a cross section of the chart 700 which illustrates the probability distribution at a particular slice of time, a1.

Returning again to FIG. 7A, there is a higher probability in the middle range of a particular cross section and a lower probability at the tails. Ninety percent of the outcomes at a particular time will fall between the upper line 705 and the lower line 715, inclusive. Exemplary probabilities associated with points x1 through x4 at time a1 are as follows: (1) there is a 5% chance of the dollar value being equal to or greater than x1; (2) there is between a 5% and a 50% chance of the dollar value being equal to or greater than x2; (3) there is a 50% chance that the dollar value will be equal to or greater than x3; and (4) there is a 95% chance that the dollar value will be equal to or greater than x4.

As one advantage of the present embodiment, rather than presenting a misleading binary result or showing the user a depiction of the underlying probability 740, the user interface may communicate the cumulative probability that the user will attain a financial goal in a pictorial fashion using certain icons to represent certain levels of probability, for example. A one-to-one correspondence may be established between predetermined levels of probabilities and icons that are used to represent the predetermined levels of probabilities.

Figure 7C:
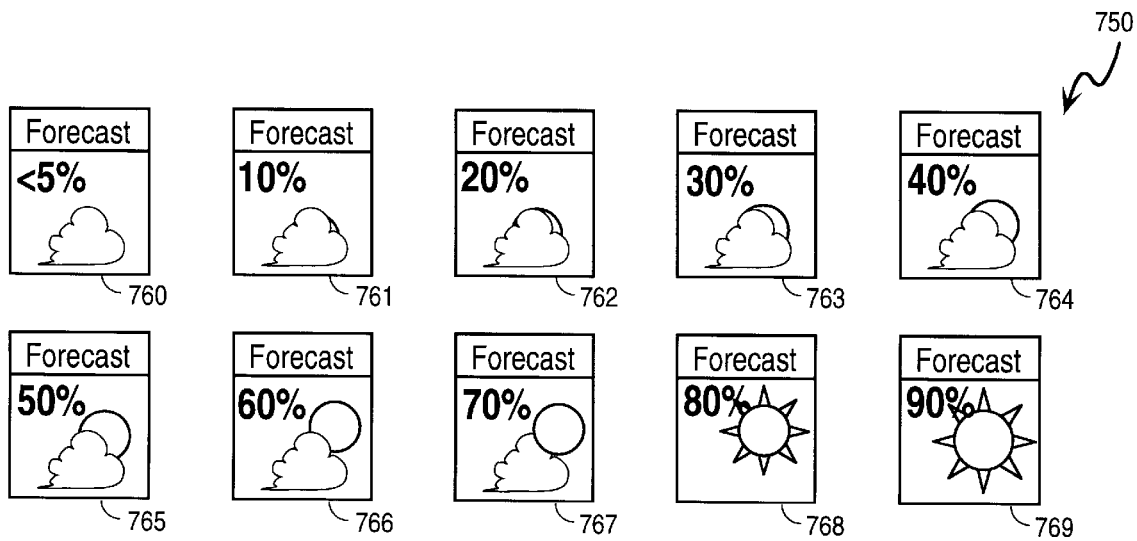
FIG. 7C is a set of icons that may be used to communicate the likelihood of achieving a financial goal according to one embodiment of the present invention.

An exemplary set of icons 750 is shown in FIG. 7C. A weather theme is employed by the set of icons 750 to communicate the likelihood of achieving the goal 720. It is appreciated various other themes may be employed. At any rate, according to this embodiment, icons 760–769 each include one or more of five basic elements: sky, clouds, sun, sun rays, and a numeric forecast. In one embodiment, the display of the basic elements may each depend on the likelihood of achieving the goal 720. For example, at certain predefined threshold values various elements may be included or excluded from the icon to be displayed. In the example depicted, the set of icons 750 range from graphical depictions of dark clouds with a dark sky to a bright sun and sun rays with a bright sky. As the likelihood of achieving the goal 720 increases the weather outlook becomes brighter. In this example, the lowest probability is represented by icon 760. Icon 760 includes a dark storm cloud and represents less than a 5% chance of the goal being achieved. Until the probability of achieving the goal reaches 50%, the cloud completely hides the sun. However, the cloud becomes lighter as the probability increases. Icon 761 represents that the user has a 10% chance of achieving his/her goal. Icon 762 represents a 20% chance. Icon 763 represents a 30% chance of achieving the goal. Icon 764 represents a 40% chance of achieving the goal. Finally, the sun begins to peek out from behind the cloud in icon 765 which represents a 50% chance of achieving the goal. Icon 766 represents a 60% chance of achieving the goal. Icon 767 represents a 70% chance of achieving the goal. Referring to icons 768 and 769, once there is an 80% chance or better of the goal being achieved, the cloud is no longer present and the sun's rays become visible. While in this example a weather theme is employed to communicate probabilities to a user, it is appreciated various other metaphors could be used.

According to one embodiment of the present invention, as the user modifies decision variables, such as retirement age, the probability distribution is evaluated and the appropriate icon is displayed to the user, as described further below.

Figure 8:
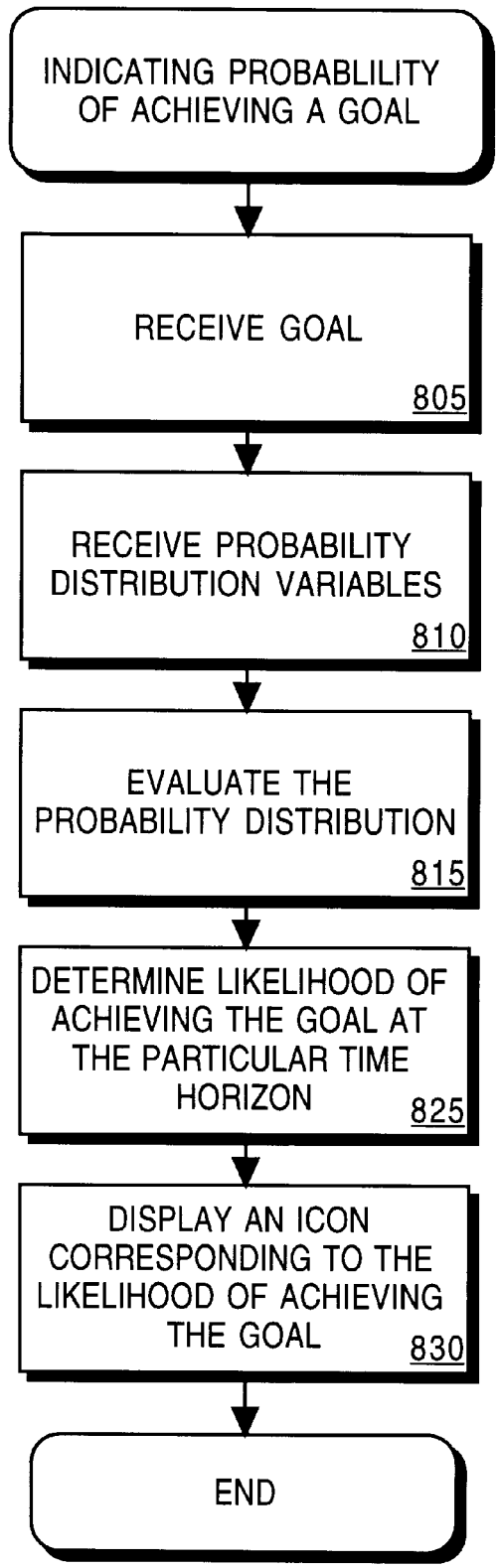
FIG. 8 is a flow diagram illustrating a method indicating the probability of achieving a financial goal according to one embodiment of the present invention.

FIG. 8 is a flow diagram illustrating a method indicating the probability of achieving a financial goal according to one embodiment of the present invention. At step 805, a goal is received. The goal may be received from the user or it may be retrieved from a user profile established during a prior session with the system, for example. The goal may represent a financial goal such as a retirement income goal or some other intermediate goal like saving for a down payment on a home, or a child's college education. In the context of investing, typically a probability distribution represents the probabilities over time that the portfolio will be worth certain amounts of money.

At step 810, values upon which the probability distribution depend are received. In the context of financial planning software, for example, these values may include the particular recommended financial products, current and projected economic conditions, and user inputs about the user's level of savings and a time horizon.

At step 815, the simulation engine generates a distribution of future values for future points in time based upon the values received at step 810. According to one embodiment, evaluating the probability distribution may comprise using an analytic approximation of a distribution of simulated values. Alternatively, a table of values may be generated in advance by a simulation engine, in which case evaluation comprises retrieving data from the lookup table corresponding to the values received at step 810.

In this manner, a range of outcomes for a particular time horizon is determined. For example, in the case of evaluating a retirement goal, the time horizon represents the user's stated desired retirement age. Referring again to FIG. 7A, the range of outcomes for a particular time horizon would represent a cross section of the two-dimensional chart 700, e.g., the values between the lower line 715 and the upper line 705, inclusive.

At step 825, the likelihood of the user achieving the goal is determined based on the cumulative probability that meets or exceeds the user's goal. For example, if the user's goal is to have a specific annual retirement income, then the cumulative probability of achieving greater than or equal to the specified income is determined.

At step 830, an indication is provided to the user of the likelihood of achieving the goal. According to one embodiment, an icon, corresponding to the likelihood determined at step 825, is displayed. In this manner, the forecast is summarized in an easily understood graphic picture.

It should be appreciated the feedback mechanism described above is also useful in an interactive environment. For example, the visual indication may be changed in real-time as the user manipulates a user interface mechanism such as a slider bar. By activating an input device (e.g., a mouse, trackball, light pen, or the like), the slider may be moved to new positions by the user. While the input device is engaged steps 810 through 830 may be repeated for each new position of the slider bar. In this manner, the forecast icon will reflect the forecast at the current position of the slider bar and the user receives feedback in the form of a changing forecast icon as the slider bar is moved to various positions. In an embodiment employing the weather forecast icons of FIG. 7B, for example, as the slider is moved by the user, the weather changes. When the input device is disengaged, the last displayed icon remains on the display.

While the embodiment above describes altering the user's probability of achieving a goal by changing the time horizon, it should be appreciated there are many other ways of altering the probability. For example, the goal may be raised or lowered, the level of savings may be increased or decreased, and the investment risk may be modified.

B. Depiction of Long-Term Risk

Figure 9:
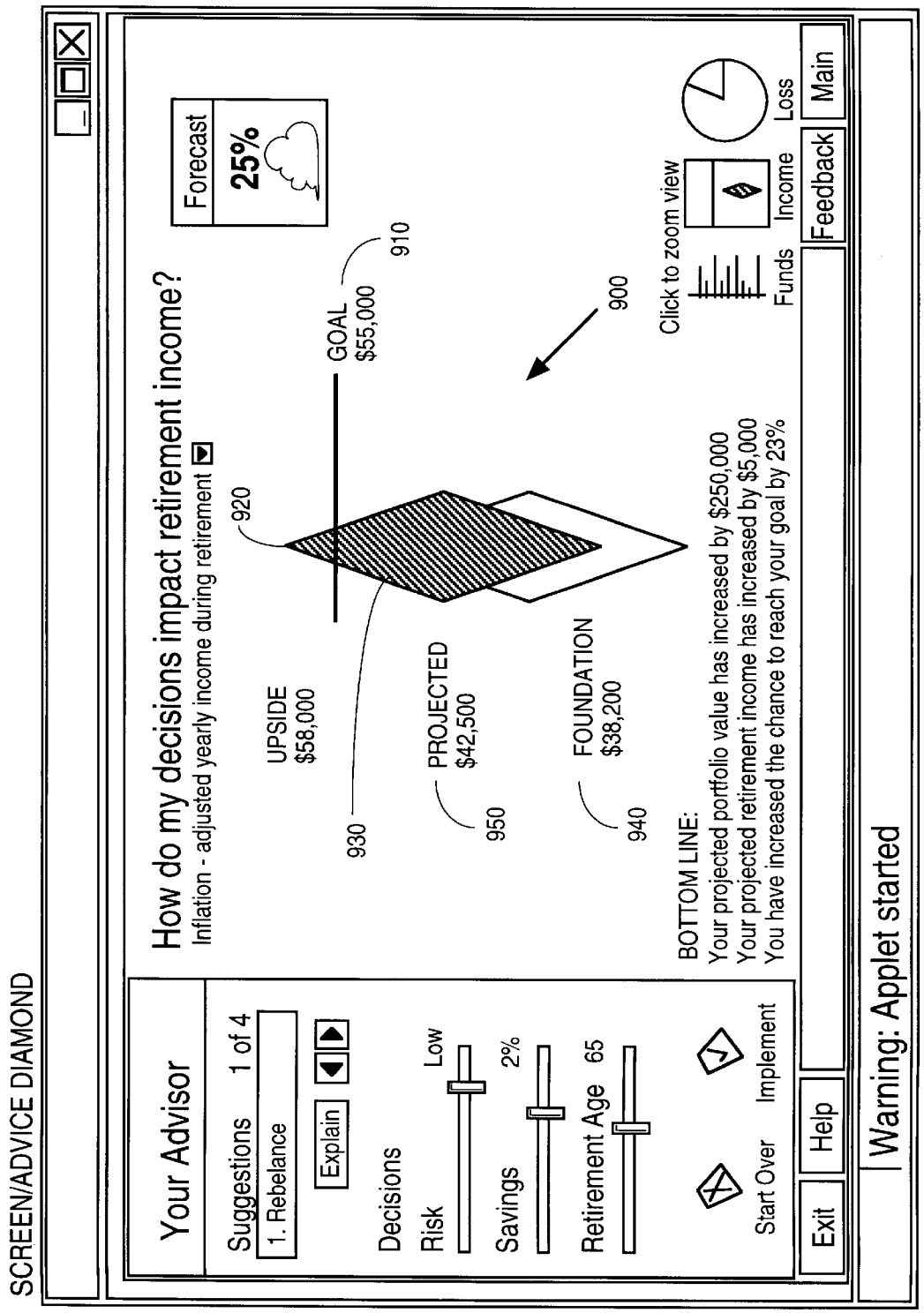
FIG. 9 illustrates a graphical device which may be employed to communicate long-term financial risk according to one embodiment of the present invention.

FIG. 9 illustrates a graphical device 900 which may be employed to communicate long-term financial risk according to one embodiment of the present invention. In the embodiment depicted, the graphical device 900 comprises a diamond 930 having indications of a financial goal 910, an upside retirement income 920, a projected retirement income 950, and a foundation value 940. In this example, the financial goal 910 represents a retirement income goal. It should be appreciated that various other financial goals may also be represented such as savings goals and other intermediate goals. In this embodiment, the upside retirement income 920 represents a 5% chance that the user will have the retirement income indicated at the retirement age specified. The projected retirement income 950 represents the expected retirement income based upon the current decision variables. The foundation value 940 represents the 5% worst case retirement income. It is appreciated that various other probabilities may be used and that such probabilities may also be user configurable.

In alternative embodiments, the indication of long-term risk may be conveyed by various other graphical devices such as the forecast icons described above or the long-term risk may simply be indicated by a number and described by accompanying text. Other examples of long-term risk include, for example, the probability of not achieving a financial goal, the size of a loss that could happen at some probability or alternatively, the probability of realizing some type of loss. Further, the long-term risk indication may include various value at risk measures.

C. Depiction of Short-Term Risk

Figure 10:
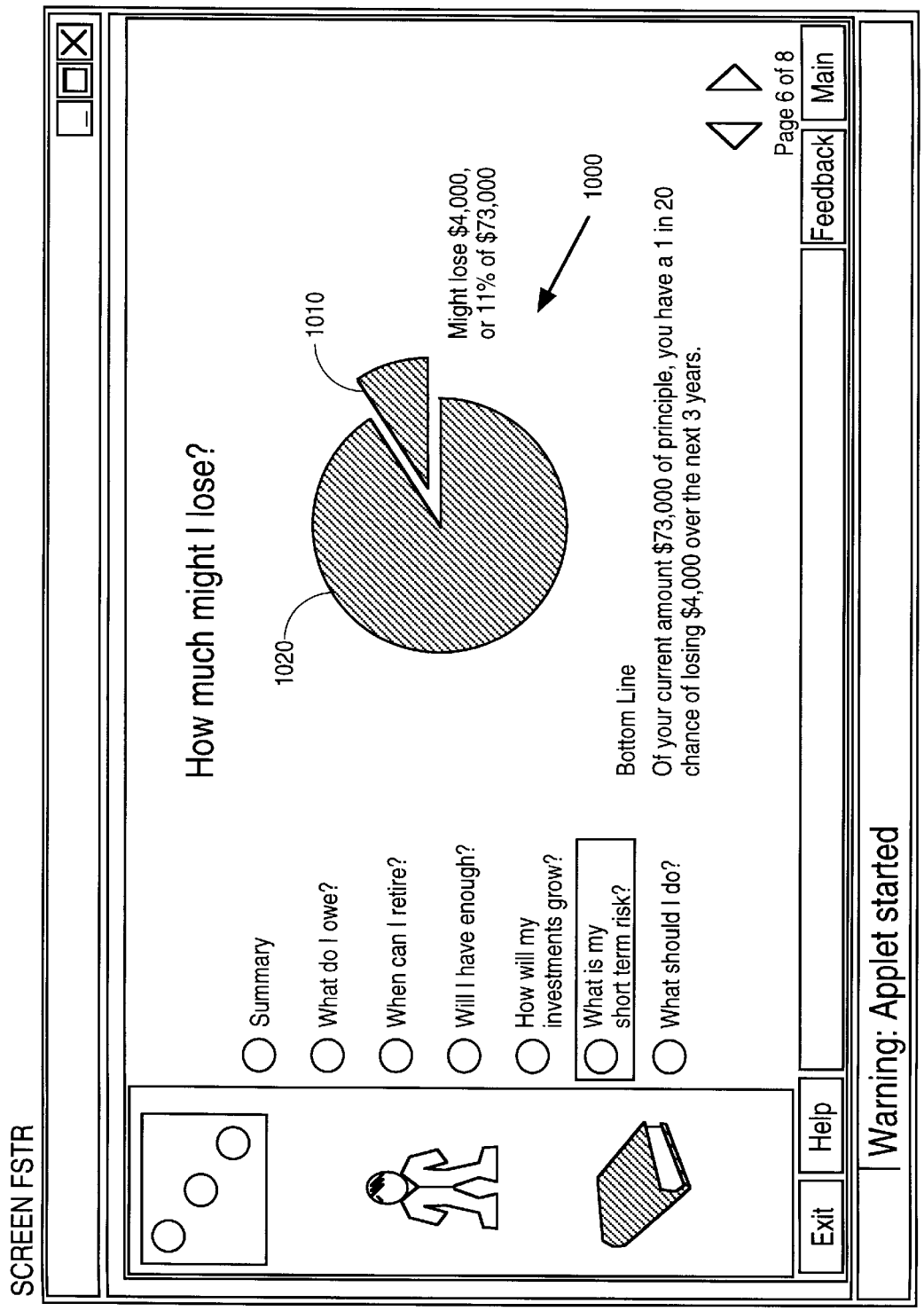
FIG. 10 illustrates a graphical device that may be used to communicate short-term financial risk according to one embodiment of the present invention.

FIG. 10 illustrates a graphical device 1000 that may be used to communicate short-term financial risk according to one embodiment of the present invention. According to the embodiment depicted, the graphical device comprises a pie chart 1000. In this embodiment, the pie chart 1000 represents the user's total wealth and shows the user how much of it might be lost in a relatively short time period. Pie chart 1000 includes two slices, a first slice 1010 and a second slice 1020. The first slice 1010 graphically illustrates the 5% downside chance of losing the amount corresponding to the size of the first slice 1010. The second slice 1020 graphically illustrates the amount of wealth that would remain after such a loss. Again, various other probability values may be employed.

In alternative embodiments, the indication of short-term risk may be communicated by various other graphical devices such as the forecast icons described above or the short-term risk may simply be indicated by a number and described by accompanying text.

Importantly, while exemplary graphical devices for conveying short- and long-term financial risk have been illustrated and discussed separately in FIGS. 9 and 10, area 420 may display multiple aspects of financial risk and various other output values concurrently on the same screen as well as individually.

Area 420 of the advice screen 400 and the UI 360, in general, may include various other output values. For example, a user may find it helpful to know what the probability of being able to retire during a particular age range or at a particular age is with a certain retirement income. Additionally, some users may wish to know what the expected amount of time to a particular financial goal is or what the worst loss possible is (e.g., the maximum draw down).

EXEMPLARY FUNCTIONALITY RELATED TO RECOMMENDED FINANCIAL PRODUCTS

A. Real-Time Depiction of Recommended Financial Product Portfolios

Figure 11:
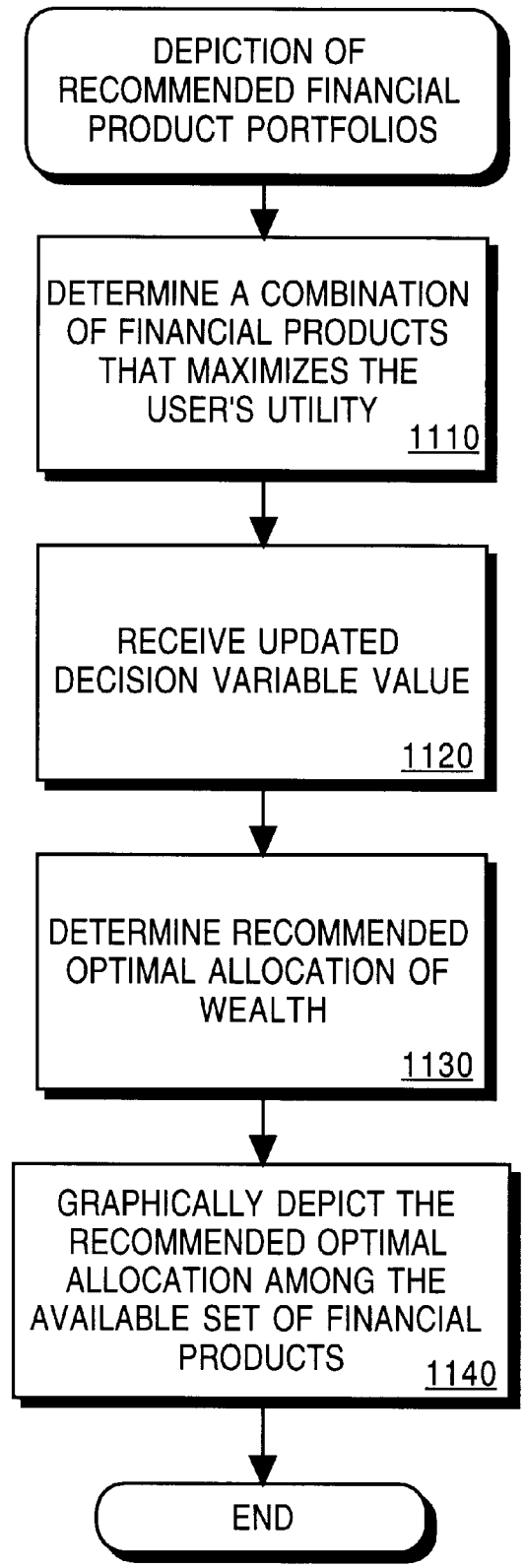
FIG. 11 is a flow diagram illustrating a method of depicting recommended financial product portfolios according to one embodiment of the present invention.

FIG. 11 is a flow diagram illustrating a method of depicting recommended financial product portfolios according to one embodiment of the present invention. At step 1110, a combination of financial products that maximizes the user's utility is determined. This recommended set of financial products is the set that provides the highest investment return given one or more decision variables specified by the user which may include one or more of risk preference, level of savings, and a time horizon. According to one embodiment, the recommended set of financial products is located on an efficient frontier comprising the set of available financial products. An efficient frontier is the space of recommended portfolios of financial products that is indexed by one or more of the decision variables and that is constrained to maximize the user's utility. Preferably, the efficient frontier determination takes into account one or more of the level of savings and a time horizon.

At step 1120, an updated decision variable value is received. According to one embodiment, the user may modify risk, savings, and/or retirement age decision variables by adjusting the position of a corresponding slider. Various other input mechanisms, graphical and/or textual, may be used, however, to receive decision variable values. For example, in alternative embodiments, text entry fields may be provided for entry of decision variables.

At step 1130, the simulation module 340 determines the optimal allocation of wealth among the financial products available to the user based upon the current values for the decision variables.

At step 1140, the optimal allocation determined in step 1130 is presented to the user in a graphical form. As above, the graphical feedback presented to the user may be provided in real-time as the user manipulates a graphical input mechanism (e.g., slider bar). For example, while an input device, such as cursor control device 223, is engaged steps 1120 through 1140 may be repeated for each new position of the selected slider bar. In this manner, the graphical depiction of the optimal allocation of wealth among the financial products will reflect the recommendation at the current position of the slider bar and the user receives feedback in the form of a dynamic graph as the slider bar is moved to various positions without deactivating the input device.

Figures 12A, 12B:
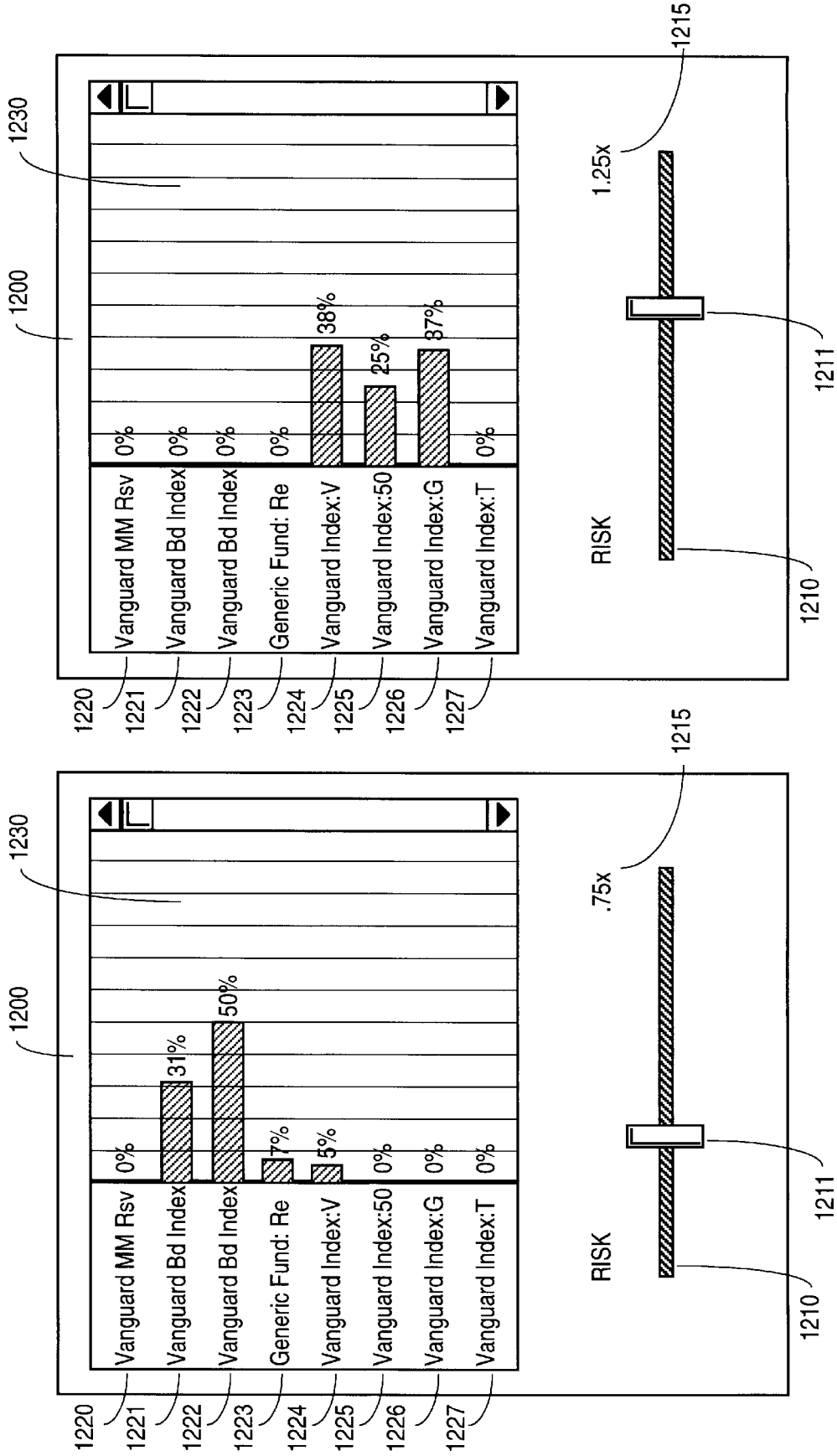
FIG. 12A illustrates a graphical device that may be used to communicate the current optimal portfolio allocation based upon the current state of the decision variables and other inputs according to one embodiment of the present invention.
FIG. 12B illustrates the graphical device of FIG. 12A after the risk decision variable has been increased according to one embodiment of the present invention.

According to one embodiment, the graphical form in which the optimal financial product allocation is depicted comprises a bar chart as illustrated in FIGS. 12A and 12B. FIG. 12A depicts an exemplary state of a screen 1200 prior to receipt of an updated decision variable value. According to the embodiment depicted, the screen 1200 includes a bar chart 1230 and one or more slider bars such as risk slider bar 1210 for receiving input decision values. The bar chart 1230 includes a list of available financial products 1220–1227. Each of the financial products 1220–1227 are displayed adjacent to a corresponding graphical segment, in this example a bar, having a size (length) representing the percentage of wealth allocated to that particular financial product according to the current recommendation. For example, the current recommended allocation of wealth suggests 31% be allocated to financial product 1221, 50% to financial product 1222, 7% to financial product 1223, and 5% to financial product 1224. In the present example, the available financial products 1220–1227 are additionally organized from top to bottom in order of increasing volatility of the financial product returns. Of course, alternative ordering and allocation units, such as dollar amounts, may be called for depending upon the implementation. The risk slider bar 1210 includes an indication of the current volatility 1215 and a slider 1211. In the present state, the risk slider bar 1210 has a volatility measure of 0.75×.

Assuming the user increases the risk, FIG. 12B represents an exemplary state of screen 1200 subsequent to receipt of a new decision variable value from the risk slider bar 1210 and after the screen 1200 has been updated with the new optimal allocation provided by the portfolio optimization module 350. The risk slider bar 1210 now has a volatility measure of 1.25× and the bar chart 1230 indicates the recommended financial product allocation corresponding to the updated risk tolerance value. The new allocation suggests 38% of the user's contributions be allocated to financial product 1224, 25% to financial product 1225, and 37% to financial product 1226.

While FIG. 12 was described with reference to a specific decision variable, risk tolerance, it should be appreciated that the receipt of new values of various other decision variables may be handled in a similar manner.

B. Modification of the Set of Recommended Financial Products

It may be the case that the user wants to modify the set of recommended financial products. For instance, desiring to hold more or less of a financial product than was recommended. In this event, the user may modify the recommendation thereby causing the system to update the recommended financial products taking into account the user's modification. Another mechanism, referred to as a user constraint, is provided by the UI 360 to allow the user to express his/her utility function by modifying the recommended allocation provided by the system. Generally, a user constraint acts as another decision input. More particularly, a user constraint provides the user with the ability to constrain the holdings of one or more financial products by manipulating the recommended financial products. In one embodiment, responsive to receiving the constraint, the portfolio optimization module 350 optimizes the remaining unconstrained financial products such that the portfolio as a whole accommodates the user's constraint(s) and is optimal for the user's level of risk tolerance. For example, the user may express his/her desire to hold a certain percentage of a particular financial product in his/her portfolio or the user may express his/her preference that a particular financial product not be held in his/her portfolio. Upon receiving the constraint, the portfolio optimization module 350 determines the allocation among the unconstrained financial products such that the recommended portfolio as a whole has the highest utility. Advantageously, in this manner, individuals with utility functions that are different than mean-variant efficient are provided with a mechanism to directly manipulate the recommended financial products to communicate their utility functions.

Figure 13:
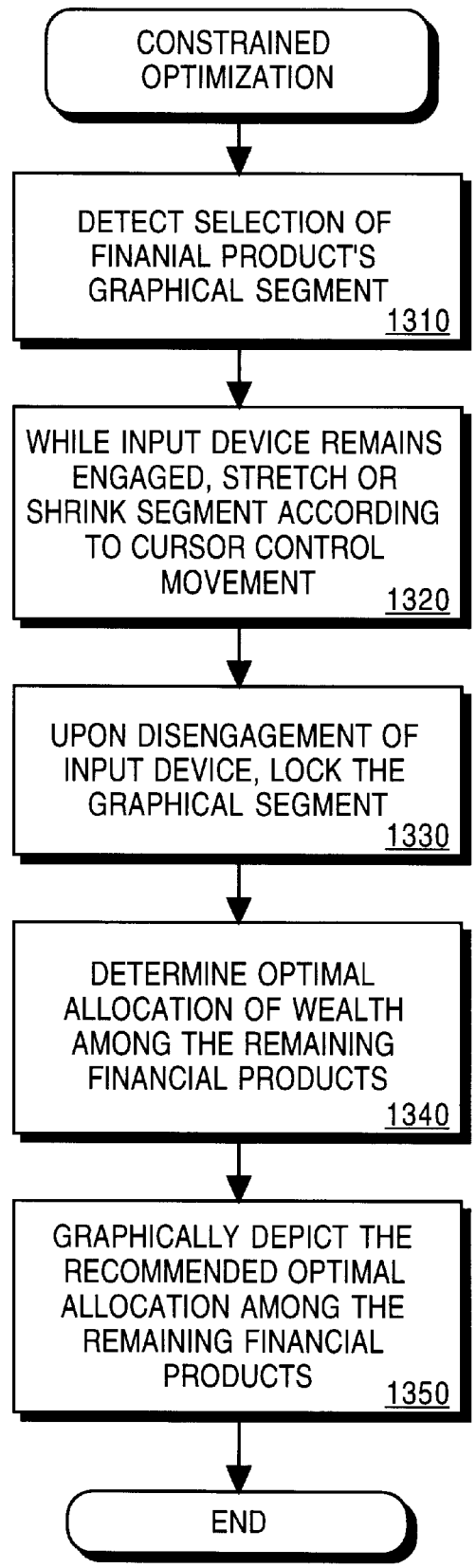
FIG. 13 is a flow diagram illustrating a method of updating a recommended portfolio based on a user specified constraint according to one embodiment of the present invention.

FIG. 13 is a flow diagram illustrating a method of updating a recommended portfolio based on a user specified constraint according to one embodiment of the present invention. At step 1310, selection of a financial product's graphical segment is detected. At step 1320, the selected segment may be resized according to cursor control movement. At step 1330, when the resizing is complete, the value associated with the graphical segment is locked. At step 1340, a new set of financial products are recommended. For example, the unconstrained financial products may be reoptimized conditional upon user constraints by determining an optimal allocation of wealth among the remaining financial products. At step 1350, the recommended optimal allocation for the unconstrained financial products is graphically depicted. It is appreciated that numerous other ways of selecting and manipulating a graphical segment are possible. For example, certain keystrokes on a keyboard such as alphanumeric input device 222 may be employed to activate various graphical segments and other keys may be used to increase or decrease the current allocation.

Again, as above, the graphical feedback presented to the user may be provided in real-time as the user manipulates the size of the graphic segment.

Figure 14B:
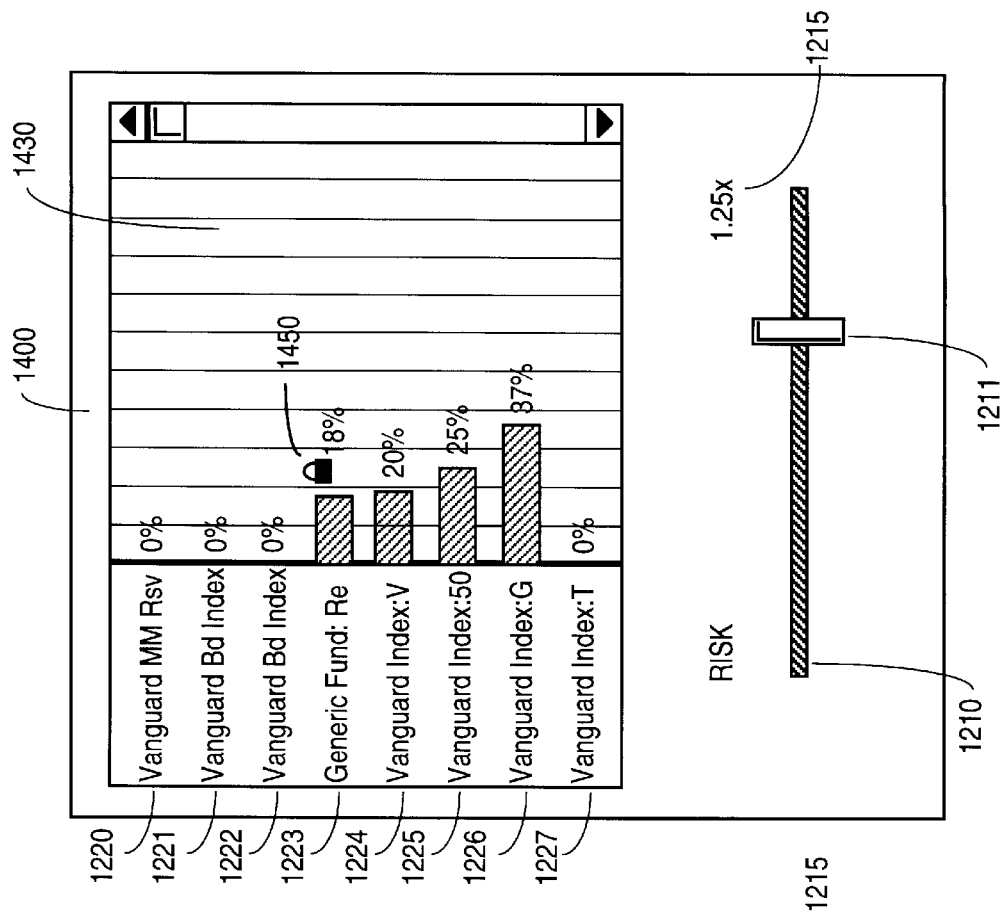
FIG. 14B illustrates the graphical device of FIG. 14A after the user has imposed a constraint upon one of the financial products.
Figure 14A:
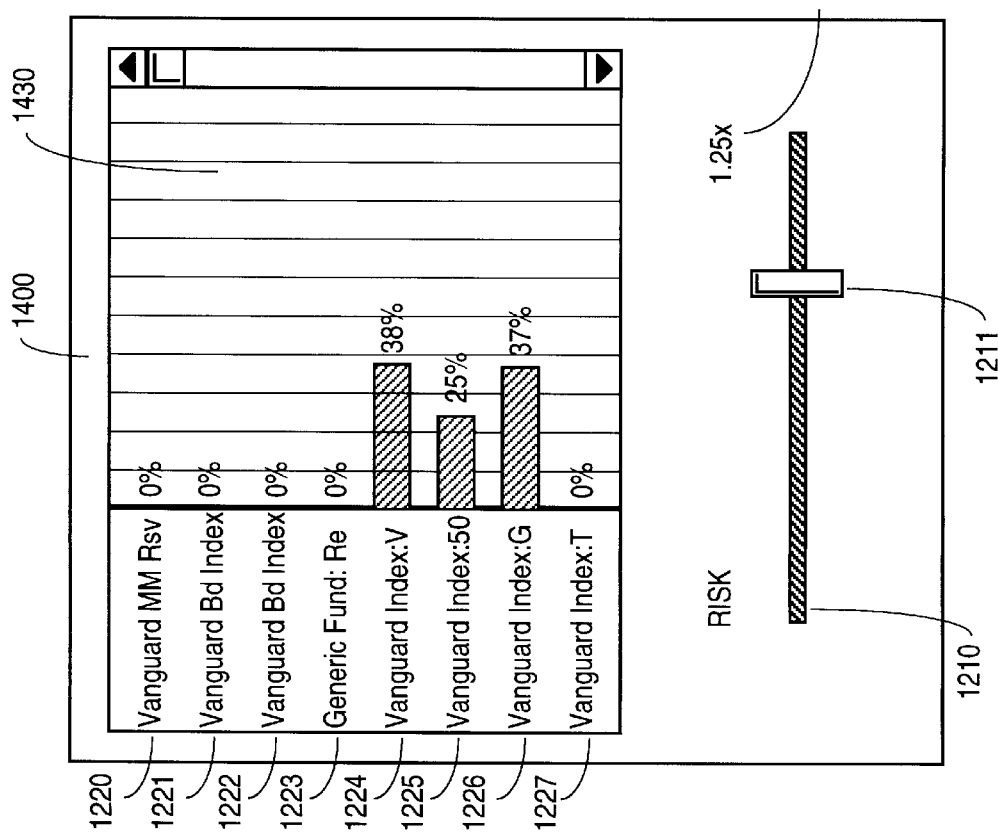
FIG. 14A illustrates a graphical device that may be used to communicate the current optimal portfolio allocation based upon the current state of the decision variables according to one embodiment of the present invention.

FIG. 14A depicts an exemplary state of a screen 1400 prior to receipt of a constraint. In this example, screen 1400 includes a bar chart 1430 depicting the current allocation of wealth among a set of financial products 1220–1227. FIG. 14B illustrates an exemplary state of screen 1400 after the user has imposed a constraint upon one of the financial products and after the screen 1400 has been updated with the new optimal allocation provided by the portfolio optimization module 350. In this example, the user has constrained the allocation of wealth to financial product 1223 to 18%. According to the embodiment depicted, after the graphical segment is locked (step 1330), a lock 1450 is displayed to remind the user of the constraint.

C. Self Explication of Preferences

By employing the UI components described above, a user may manipulate decision variables and/or the recommended portfolio and simultaneously see the impact on the set of outcomes. This process of self explication of preferences will now briefly be described.

According to one embodiment of the present invention, during an initial session with the financial advisory system 100, the user may provide information regarding risk preferences, savings preferences, current age, gender, income, expected income growth, current account balances, current financial product holdings, current savings rate, retirement age goal, retirement income goals, available financial products, intermediate and long-term goals, constraints on fund holdings, liabilities, expected contributions, state and federal tax bracket (marginal and average). The user may provide information for themselves and each profiled person in their household. This information may be saved in one or more files in the financial advisory system 100, preferably on one of the servers to allow ongoing plan monitoring to be performed. In other embodiments of the present invention additional information may be provided by the user, for example, estimates of future social security benefits or anticipated inheritances.

In any event, based on the user's current holdings and the other data input by the user, the financial advisory system 100 may provide various output values. The simulation module 340 may provide a probability distribution of future portfolio values based on a set of recommended financial products and current decisions including, for example, risk preference, savings rate, and desired retirement age. Additionally, in view of the user's financial goals, the current decision variables, and the probability distribution, the simulation module 340 may provide an initial diagnosis which may result in a series of suggested actions to the user regarding a recommended portfolio that maximizes utility conditional upon the current decision variables.

Once the user has provided the financial advisory system with any necessary information, an interactive process of modifying the value of a decision variable, observing the change in one or more output values associated with the current decision variable values, and seeing the recommended financial products that created that particular change may begin. This process of the system providing feedback and the user adjusting decisions may continue until the user has achieved a desired set of decision values and financial products that produce a desired set of results. Advantageously, using this interactive approach, the user is never asked to predict the future with regard to interest rates, inflation, expected portfolio returns, or other difficult to estimate economic variables and parameters.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a financial analysis system, a method of allowing a user to interactively explore how changes in one or more input decisions affect one or more output values, the method comprising the steps of:

concurrently displaying
   a first visual indication depicting input mechanism for receiving one or more input decisions, and a second visual indication depicting a set of output values, the set of output values based upon the one or more input decisions and a recommended set of financial products;

receiving updated values for the one or more input decisions via one or more depicted input mechanisms;

determining a new recommended set of financial products and a new set of output values based upon the updated values;

updating the second visual indication to reflect the new set of output values; and displaying a third visual indication depicting the recommended set of financial products, the recommended set of financial products conditional on the one or more input decisions.

2. The method of claim 1, wherein the first, second, and third visual indications are displayed concurrently.

3. The method of claim 2, wherein the set of output values are grouped together in a first predefined portion of a display, the recommended set of financial products are grouped together in a second predefined portion of the display, and the input mechanisms are grouped together in a third predefined portion of the display.

4. The method of claim 1, wherein the set of output values are grouped together in a first predefined portion of a display and the recommended set of financial products are grouped together in a second predefined portion of the display.

5. The method of claim 1, wherein the input decisions include a level of investment risk.

6. The method of claim 5, wherein the input decisions include a measure of saving.

7. The method of claim 5, wherein the input decisions include a time horizon.

8. The method of claim 7, wherein one or more of the input mechanisms are slider bars.

9. The method of claim 7, wherein one or more of the input mechanisms are text entry fields.

10. The method of claim 1, wherein the output values include a probability of achieving a financial goal at a particular time horizon.

11. The method of claim 10, wherein the output values include a long-term financial risk associated with the one or more input decisions.

12. The method of claim 10, wherein the output values include a short-term financial risk associated with the one or more input decisions.

13. The method of claim 1, wherein the recommended set of financial products include one or more mutual funds.

14. In a financial analysis system, a method of allowing a user to interactively explore how changes in one or more input decisions affect one or more output values, the method comprising the steps of:

concurrently displaying a first visual indication depicting input mechanisms for receiving one or more input decisions, and a second visual indication depicting a set of output values, the set of output values based upon the one or more input decisions and a recommended set of financial products;

receiving updated values for the one or more input decisions via one or more depicted input mechanisms;

determining a new recommended set of financial products and a new set of output values based upon the updated values;

updating the second visual indication to reflect the new set of output values; and wherein the set of output values include a probability of achieving a financial goal.

15. In a financial analysis system, a method of allowing a user to interactively explore how changes in one or more input decisions affect one or more output values, the method comprising the steps of:

concurrently displaying a first visual indication depicting input mechanism for receiving one or more input decisions, and a second visual indication depicting a set of output values, the set of output values based upon the one or more input decisions and a recommended set of financial products;

receiving updated values for the one or more input decisions via one or more depicted input mechanisms;

determining a new recommended set of financial products and a new set of output values based upon the updated values;

updating the second visual indication to reflect the new set of output values; and wherein the one or more input decisions include a level of risk and a level of saving.

16. In a financial analysis system, a method of calibrating a graphical input mechanism, the graphical input mechanism allowing a user to specify a desired level of investment risk, the method comprising the steps of:

receiving a set of available financial products;

constraining settings associated with the graphical input mechanism based upon the set of available financial products;

receiving a predefined volatility; and forming a relationship between a setting of the graphical input mechanism and the predefined volatility.

17. The method of claim 16, wherein each financial product in the set of available financial products is associated with a volatility, the step of constraining settings associated with the graphical input mechanism further includes the step of constraining settings to lie between a lowest volatility setting and a highest volatility setting, the lowest volatility setting being associated with the volatility of a lowest-volatility financial product in the set of available financial products and the highest volatility setting being associated with the volatility of a highest-volatility financial product in the set of available financial products.

18. The method of claim 16, wherein each setting of the graphical input mechanism is associated with a volatility, and wherein each volatility is associated with a subset of the available set of financial products.

19. The method of claim 18, wherein the graphical input mechanism comprises a risk slider bar.

20. The method of claim 19, wherein the risk slider bar has a midpoint setting, and the volatility associated with the midpoint setting is defined relative to the predefined volatility.

21. The method of claim 20, wherein the predefined volatility is defined relative to the volatility associated with the Market Portfolio.

22. The method of claim 20, wherein each setting of the graphical input mechanism is associated with a unit, and wherein the unit is expressed in terms of the relationship between the volatility associated with the setting and the predefined volatility.

23. The method of claim 16, wherein the graphical input mechanism comprises a risk slider bar.

24. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein each of a plurality of probability values is associated with a corresponding icon, and wherein the step of providing a visual indication to the user of the probability of achieving the financial goal further includes the step of displaying the icon corresponding to the probability of achieving the financial goal.

25. The method of claim 24, wherein the plurality of icons comprises weather forecast icons incorporating various combinations of clouds, sun, and sky.

26. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based on the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the financial goal is associated with a particular time horizon.

27. The method of claim 26, wherein the step of receiving one or more inputs upon which a probability distribution id dependent includes receiving a level of investment risk.

28. The method of claim 27, wherein the step of receiving one or more inputs upon which a probability distribution id dependent includes receiving a savings rate.

29. The method of claim 28, wherein the financial goal is a retirement income goal.

30. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the probability distribution is generated by a simulator.

31. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the probability distribution is obtained by retrieving values from a lookup table.

32. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the probability distribution is generated by an analytic approximation of a distribution of simulated values.

33. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the financial goal comprises a retirement standard of living goal.

34. A method of providing an indication to a user of a probability of achieving a financial goal, the method comprising the steps of:

a. receiving a financial goal from the user;

b. receiving one or more inputs upon which a probability distribution is dependent, the probability distribution representing a set of possible future portfolio values based upon the one or more inputs;

c. determining the probability of achieving the financial goal by evaluating the cumulative probability distribution that meets or exceeds the financial goal;

d. responsive to the determining step, providing a visual indication to the user of the probability of achieving the financial goal; and e. wherein the one or more inputs include one or more of a level of risk and a level of savings.

35. A method of providing an indication to a user of a probability of achieving a financial goal, the method comprising the steps of:

a. receiving a financial goal from the user;
b. receiving one or more inputs upon which a probability distribution is dependent, the probability distribution representing a set of possible future portfolio values based upon the one or more inputs;
c. determining the probability of achieving the financial goal by evaluating the cumulative probability distribution that meets or exceeds the financial goal;
d. responsive to the determining step, providing a visual indication to the user of the probability of achieving the financial goal, wherein the visual indication of the probability of achieving the financial goal is updated in real-time;
e. detecting the engagement of an input device; and
f. while the input device is engaged, repeating steps b, c, and d.

36. In a financial analysis system, a method of presenting various aspects of financial risk to a user in order to help the user deal with and control the financial risk, the method comprising the steps of:
receiving a financial goal from the user;
receiving one or more inputs including decision variables upon which a probability distribution is dependent, the probability distribution representing probabilities over time of the user having a certain amount of wealth;
displaying a first visual representation which illustrates a short-term financial risk associated with the one or more decision variables;
displaying a second visual representation which illustrates a risk of not achieving the financial goal based upon the probability distribution; and
displaying a third visual representation which illustrates a long-term financial risk associated with the one or more decision variables.

37. In a financial analysis system, a method of presenting various aspects of financial risk to a user in order to help the user deal with and control the financial risk, the method comprising the steps of:
receiving a financial goal from the user;
receiving one or more inputs including decision variables upon which a probability distribution is dependent, the probability distribution representing probabilities over time of the user having a certain amount of wealth;
displaying a first visual representation which illustrates a short-term financial risk associated with the one or more decision variables;
displaying a second visual representation which illustrates a risk of not achieving the financial goal based upon the probability distribution; and
wherein the financial goal includes a time horizon, and wherein the short-term financial risk represents a largest amount of wealth that may be lost within a predetermined confidence level over a short amount of time relative to the time horizon.

38. In a financial analysis system, a method of presenting various aspects of financial risk to a user in order to help the user deal with and control the financial risk, the method comprising the steps of:
receiving a financial goal from the user;
receiving one or more inputs including decision variables upon which a probability distribution is dependent, the probability distribution representing probabilities over time of the user having a certain amount of wealth;
displaying a first visual representation which illustrates a short-term financial risk associated with the one or more decision variables;
displaying a second visual representation which illustrates a risk of not achieving the financial goal based upon the probability distribution; and
wherein the second visual representation comprises an icon indicating a probability of achieving the financial goal at a particular time horizon.

39. In a financial analysis system, a method of presenting various aspects of financial risk to a user in order to help the user deal with and control the financial risk, the method comprising the steps of:
receiving a financial goal from the user;
receiving one or more inputs including decision variables upon which a probability distribution is dependent, the probability distribution representing probabilities over time of the user having a certain amount of wealth;
displaying a first visual representation which illustrates a short-term financial risk associated with the one or more decision variables;
displaying a second visual representation which illustrates a risk of not achieving the financial goal based upon the probability distribution; and
wherein the first and second visual representations are displayed concurrently.

40. A method of illustrating a recommended allocation of wealth among an available set of financial products, the method comprising the steps of:
receiving one or more decision inputs;
receiving a set of available financial products, each financial product having an associated volatility;
ordering the set of available financial products by volatility; and
for each financial product in the set of available financial products
determining a recommended allocation of wealth based upon the one or more decision inputs, and
displaying a graphical indication of the recommended allocation of wealth, the graphical indication including a graphical segment having a length corresponding to the recommended allocation.

41. In a financial advisory system, a method of updating a recommendation based on a user specified constraint, the method comprising the steps of:
providing a graphical indication of a current recommended allocation of wealth among an available set of financial products, the graphical indication including graphical segments each having a size corresponding to the current recommended allocation for the associated financial product;
responsive to activation of an input device, resizing a selected graphical segment to correspond in size to a user desired allocation;
determining a new recommended allocation while keeping the allocation of the financial product corresponding to the selected segment fixed at the user desired allocation; and
updating the graphical indication to represent the new recommended allocation.

42. The method of claim 41, wherein the step of determining a new recommended allocation further includes the step of reoptimizing a remaining set of financial products.

43. The method of claim 41, wherein the step of determining a new recommended allocation occurs upon deactivation of the input device.

44. The method of claim 41, wherein the step of determining a new recommended allocation occurs in real-time.

* * * * *

UNITED STATES PATENT AND TRADEMARK OFFICE
CERTIFICATE OF CORRECTION

PATENT NO. : 5,918,217
DATED : June 29, 1999
INVENTOR(S) : Maggioncalda et al.

It is certified that error appears in the above-identified patent and that said Letters Patent is hereby corrected as shown below:

column 3 at line 2 delete "i" and insert --a-- column 11 at line 60 delete "is" and insert --as-- column 18 at line 66 delete "mechanism" and insert --mechanisms-- column 19 at line 31 delete "saving" and insert --savings-- column 20 at line 21 delete "saving" and insert --savings-- column 21 at line 40 delete "id" and insert --is-- column 21 at line 43 delete "id" and insert --is--

Signed and Sealed this

Fourteenth Day of December, 1999

Attest:

Q. TODD DICKINSON

*Attesting Officer*  *Acting Commissioner of Patents and Trademarks*